US010051671B2

(12) United States Patent
Takae et al.

(10) Patent No.: US 10,051,671 B2
(45) Date of Patent: Aug. 14, 2018

(54) TERMINAL DEVICE AND INFORMATION PROCESSING DEVICE

(71) Applicant: SONY CORPORATION, Tokyo (JP)

(72) Inventors: Shinji Takae, Tokyo (JP); Katsutoshi Itoh, Tokyo (JP); Hideyuki Suzuki, Tokyo (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 15/104,326

(22) PCT Filed: Oct. 28, 2014

(86) PCT No.: PCT/JP2014/078666
§ 371 (c)(1),
(2) Date: Jun. 14, 2016

(87) PCT Pub. No.: WO2015/098274
PCT Pub. Date: Jul. 2, 2015

(65) Prior Publication Data
US 2016/0330774 A1 Nov. 10, 2016

(30) Foreign Application Priority Data

Dec. 25, 2013 (JP) ................. 2013-267428

(51) Int. Cl.
H04W 76/10 (2018.01)
H04W 4/80 (2018.01)
(Continued)

(52) U.S. Cl.
CPC ............. *H04W 76/10* (2018.02); *H04W 4/80* (2018.02); *H04W 8/183* (2013.01); *H04W 12/06* (2013.01);
(Continued)

(58) Field of Classification Search
CPC ..... H04W 76/02; H04W 12/06; H04W 4/008; H04W 8/183; H04W 8/20
See application file for complete search history.

(56) References Cited

U.S. PATENT DOCUMENTS

2004/0180657 A1* 9/2004 Yaqub ................. H04L 63/0853
455/435.1
2006/0052085 A1* 3/2006 Gregrio
Rodriguez .......... H04L 12/2859
455/411

(Continued)

FOREIGN PATENT DOCUMENTS

JP 2005-524341 A 8/2005
JP 2006-041962 A 2/2006
JP 2013-197756 A 9/2013

*Primary Examiner* — Paul H Masur
(74) *Attorney, Agent, or Firm* — Oblon, McClelland, Maier & Neustadt, L.L.P.

(57) ABSTRACT

[Object] To enable a time before communication by way of a wireless network starts to be further reduced.
[Solution] Provided is a terminal device including: an acquisition unit configured to acquire authentication information provided by another terminal device configured to perform mobile communication in a mobile communication network; and an authentication execution unit configured to perform an authentication procedure for connecting to a wireless network different from the mobile communication network by using the authentication information. The authentication information includes information provided by a subscriber identity module of the other terminal device or information generated based on the information. The acquisition unit acquires at least some of the authentication information before the authentication procedure starts.

9 Claims, 14 Drawing Sheets

(51) Int. Cl.
*H04W 12/06* (2009.01)
*H04W 8/18* (2009.01)
H04W 88/06 (2009.01)
H04W 8/20 (2009.01)
H04W 84/12 (2009.01)

(52) U.S. Cl.
CPC .............. *H04W 8/20* (2013.01); *H04W 84/12* (2013.01); *H04W 88/06* (2013.01)

(56) References Cited

U.S. PATENT DOCUMENTS

| | | | |
|---|---|---|---|
| 2009/0156253 A1* | 6/2009 | Shi | H04L 29/1216 455/558 |
| 2011/0244797 A1* | 10/2011 | Kulkarni | H04L 67/14 455/41.1 |
| 2012/0233685 A1* | 9/2012 | Palanigounder | H04W 12/06 726/9 |
| 2016/0171201 A1* | 6/2016 | Schroder | H04B 5/0031 726/20 |

* cited by examiner

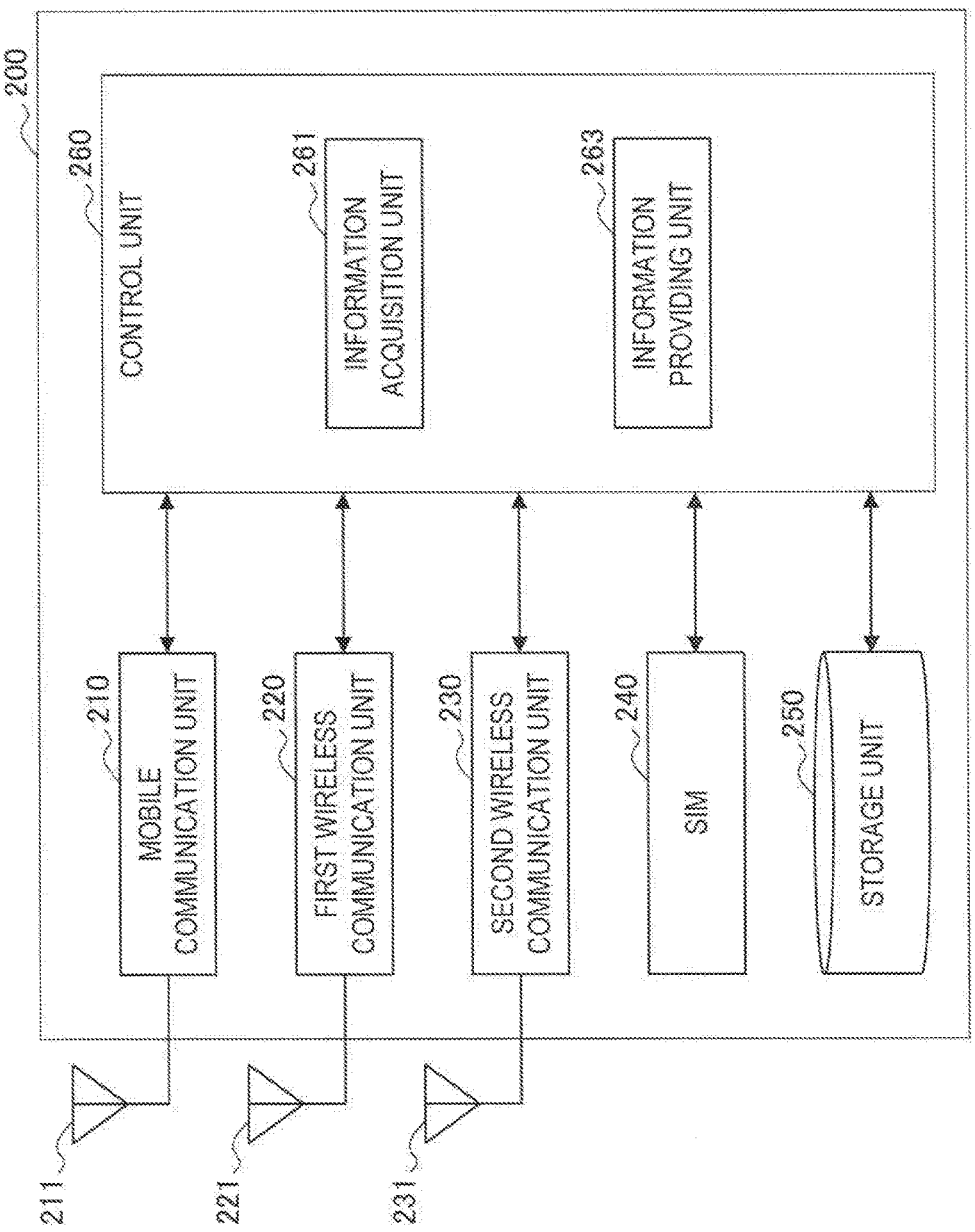

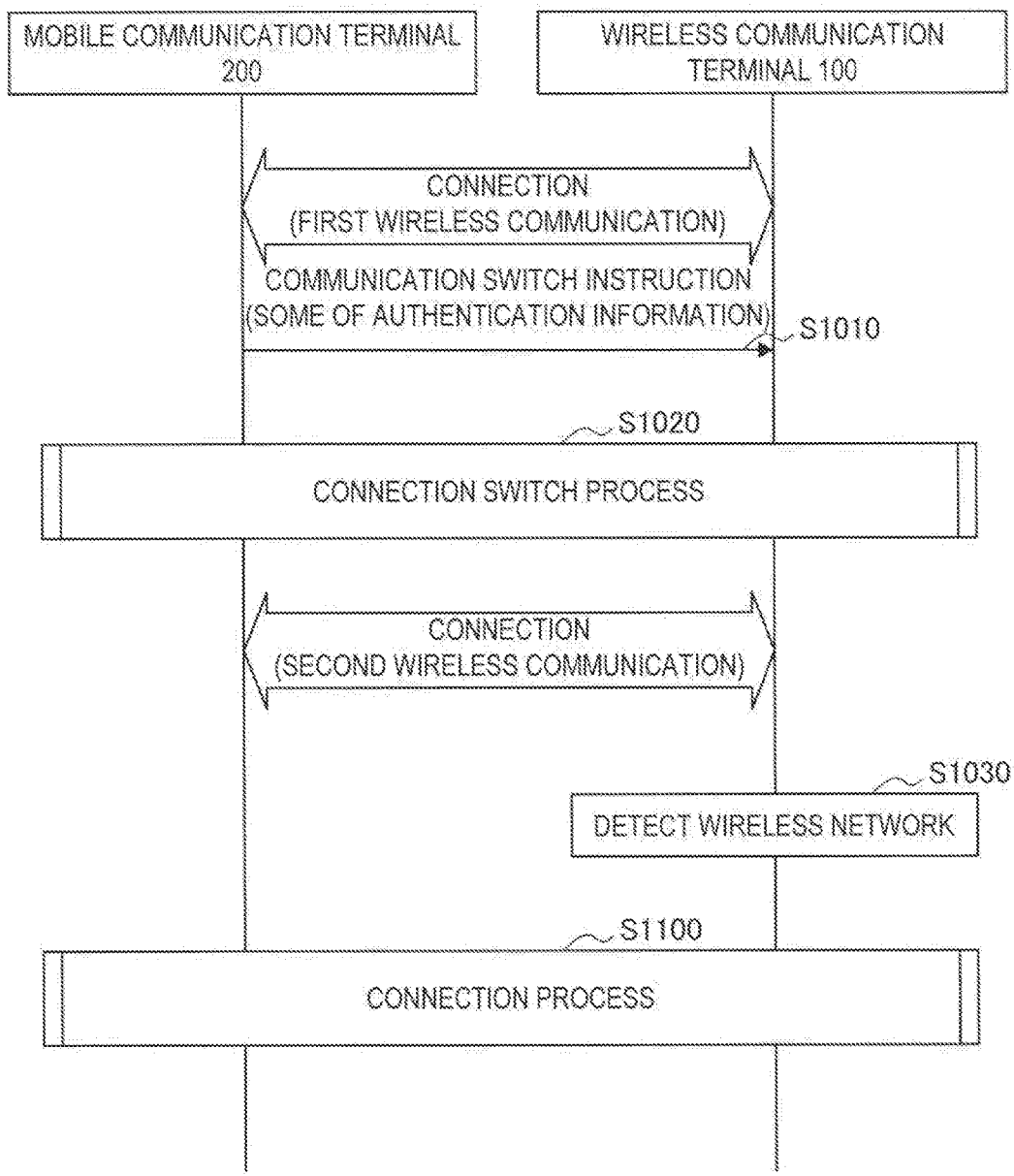

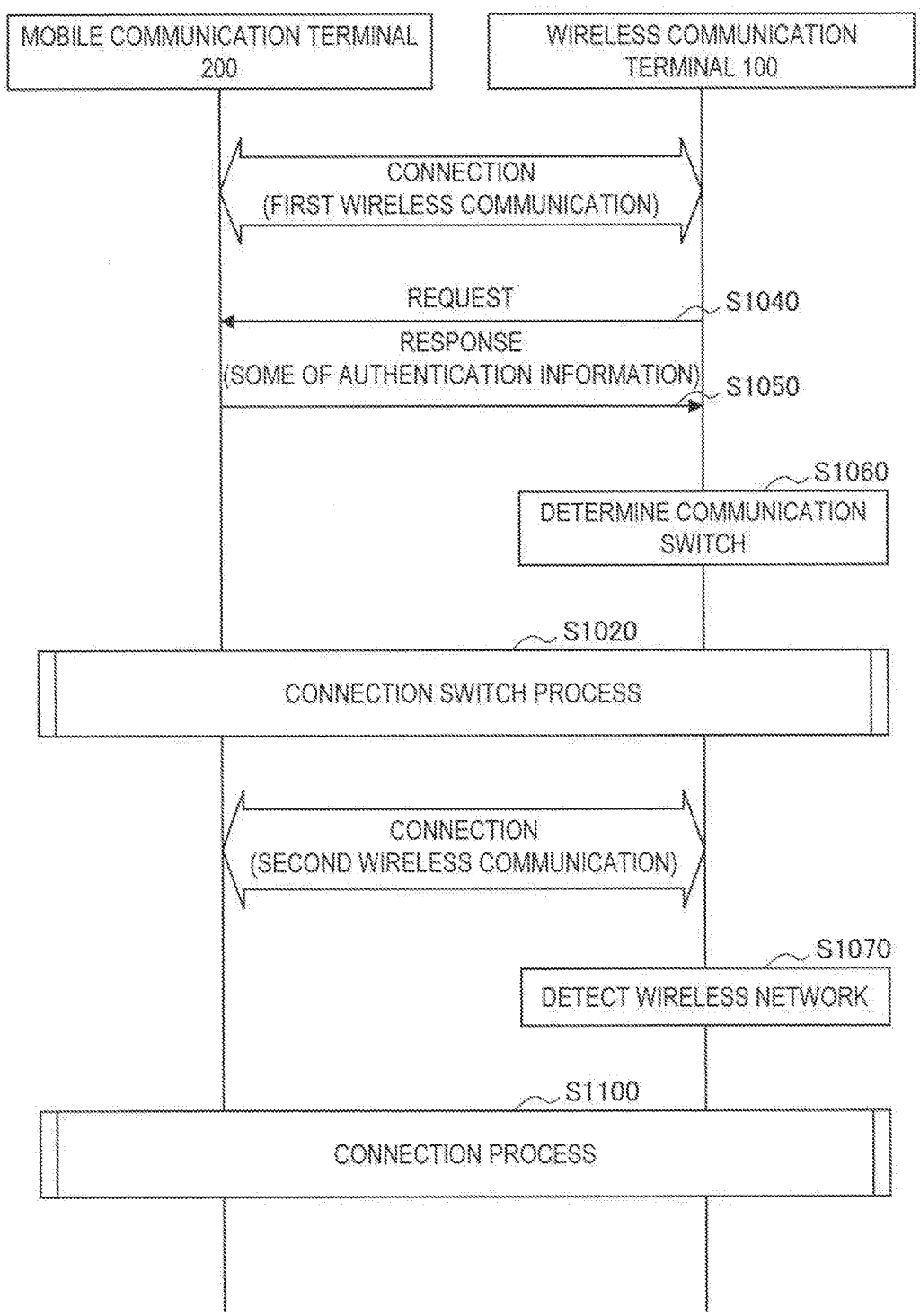

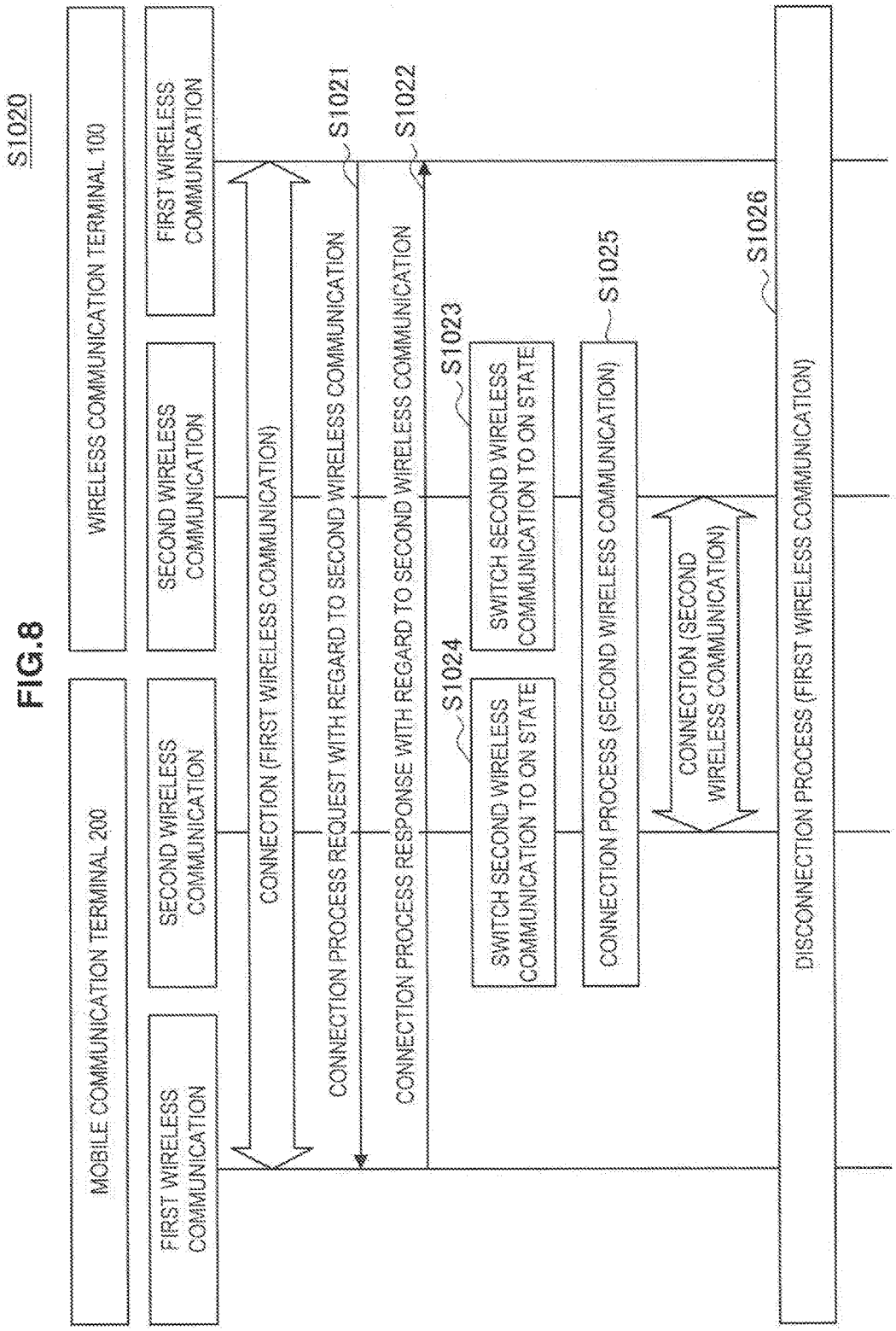

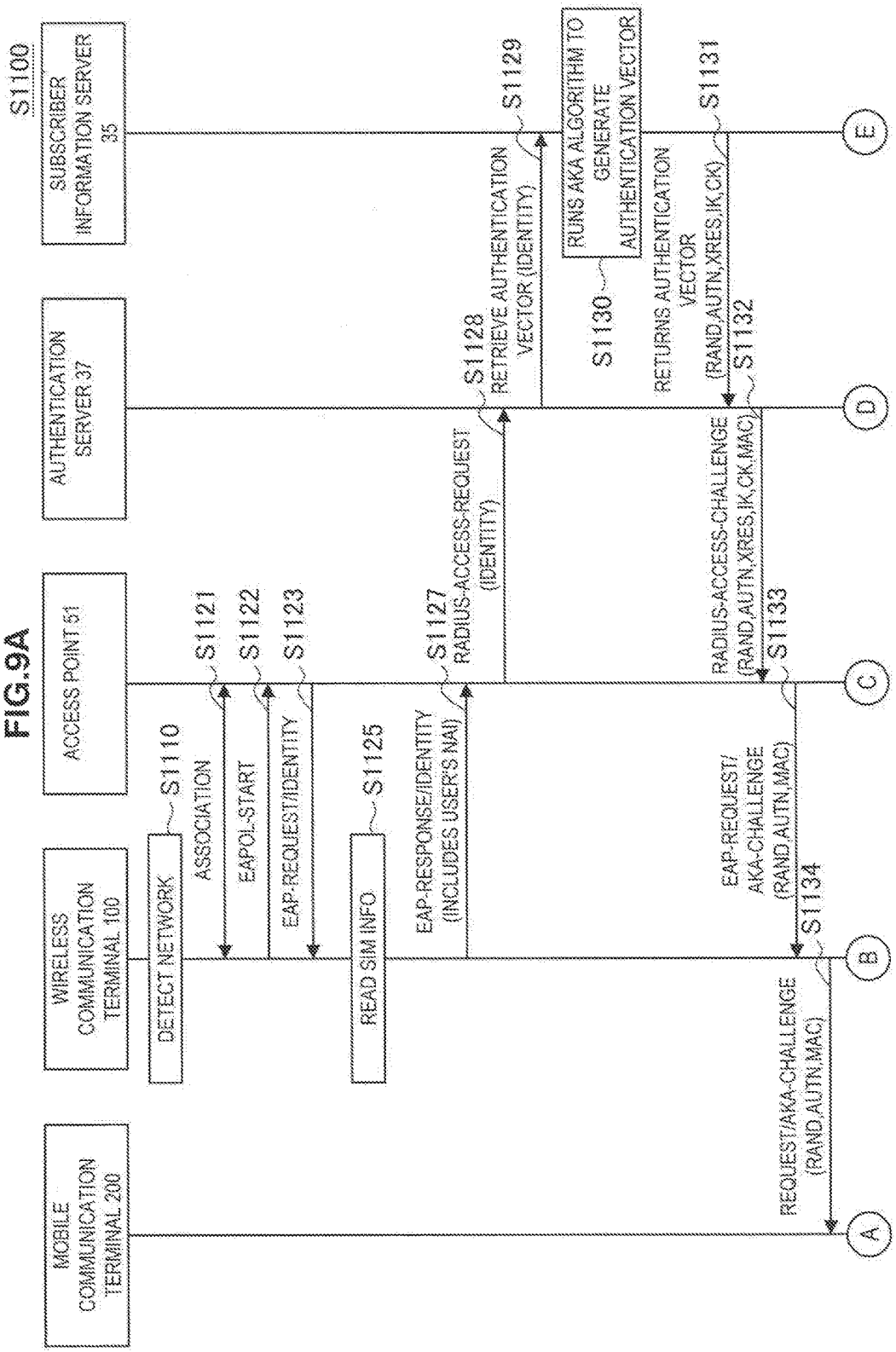

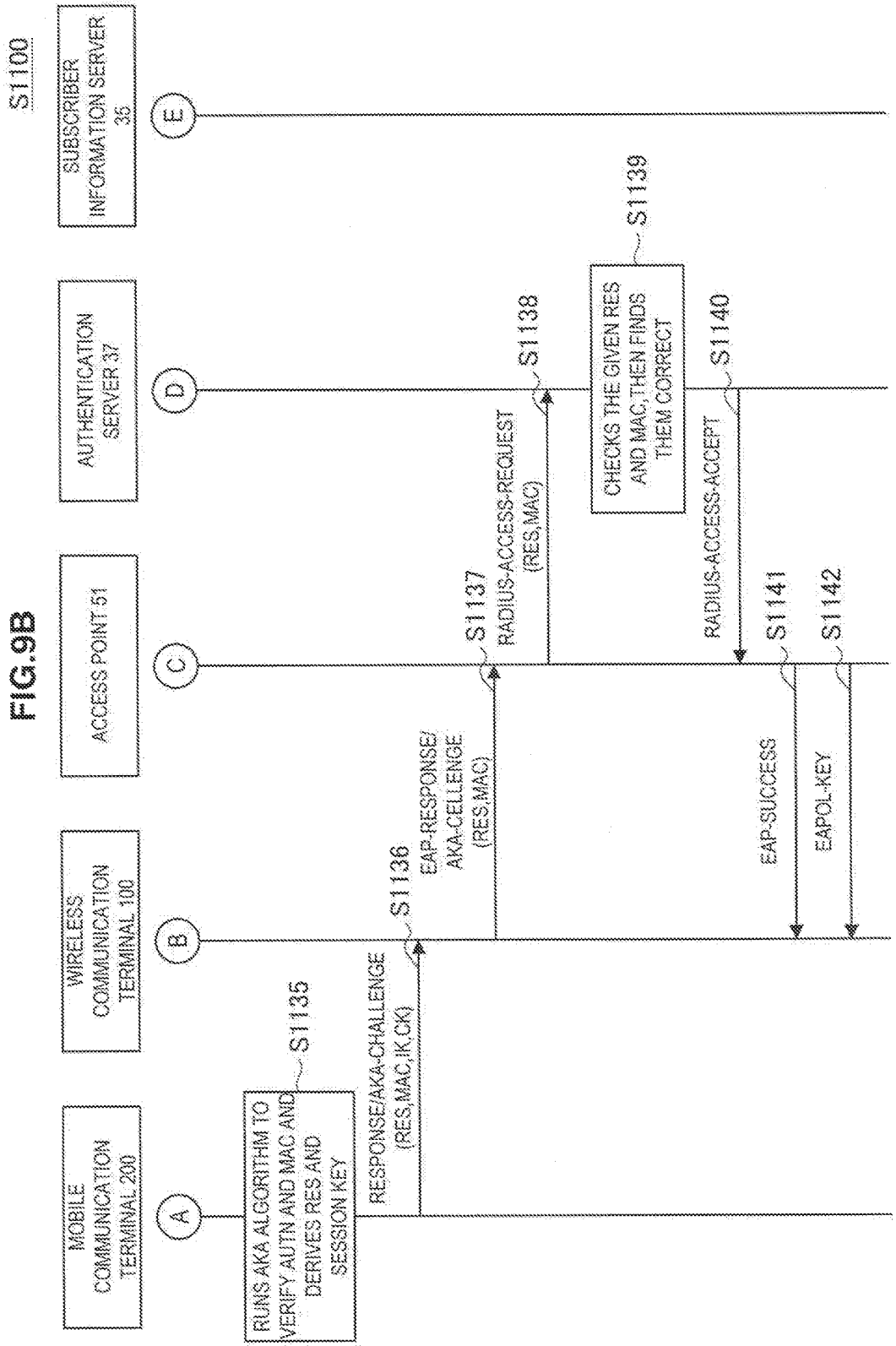

TERMINAL DEVICE AND INFORMATION PROCESSING DEVICE

CROSS REFERENCE TO RELATED APPLICATIONS

This application is a U.S. National Phase of International Patent Application No. PCT/JP2014/078666 filed on Oct. 28, 2014, which claims priority benefit of Japanese Patent Application No. JP 2013-267428 filed in the Japan Patent Office on Dec. 25, 2013. Each of the above-referenced applications is hereby incorporated herein by reference in its entirety.

TECHNICAL FIELD

The present disclosure relates to a terminal device and an information processing device.

BACKGROUND ART

In recent years, apparatuses with a communication function using a wireless local area network (WLAN) have become widespread. As examples of the apparatuses, beginning with smartphones that also have a mobile communication function, various kinds of apparatuses such as personal computers (PCs), tablet terminals, portable game devices, digital cameras, and printers are exemplified.

In general, an apparatus with a WLAN communication function is connected to a WLAN to perform transmission and reception of data by way of the WLAN. In other words, the apparatus performs transmission and reception of data by way of an access point of the WLAN. In addition, as an example of communication not by way of a WLAN (or an access point), the apparatus is, for example, connected to a mobile communication terminal and performs transmission and reception of data by way of the mobile communication terminal and a mobile communication network. That is, the apparatus performs transmission and reception of data through tethering. With regard to tethering, various technologies have been proposed.

For example, Patent Literature 1 discloses a technology for enabling a device that is a relay destination to continue communication even when an amount of electric charge of a device that performs relaying using tethering decreases.

CITATION LIST

Patent Literature

Patent Literature 1: JP 2013-197756A

SUMMARY OF INVENTION

Technical Problem

In general, communication by way of a WLAN (or an access point) like that described above can only be performed in a limited area (i.e., a communication area of a WLAN). On the other hand, in communication using tethering like that described above, a communication speed can be low due to a communication situation of a mobile communication terminal or a communication speed of the mobile communication. In addition, radio resources consumed on a mobile communication network and power consumption of a mobile communication terminal can increase. Thus, when communication by way of a WLAN (or an access point) becomes possible while communication is being performed through tethering, it is desirable for an apparatus to promptly switch communication from communication using tethering to communication by way of a WLAN.

However, a long time may pass before communication by way of a WLAN starts. For example, when the apparatus connects to a new access point, in general, for user authentication of the apparatus, it is necessary for a user of the apparatus to input a password. When the apparatus is an apparatus configured to perform mobile communication, it is possible to perform authentication (for example, EAP-SIM authentication) using a subscriber identity module (SIM). However, when the apparatus is not an apparatus configured to perform mobile communication, it is unable to perform such authentication. Accordingly, a long time may pass before communication by way of a WLAN starts.

Therefore, it is preferable that a mechanism that enables a time before communication by way of a wireless network starts to be further reduced be provided.

Solution to Problem

According to the present disclosure, there is provided a terminal device including: an acquisition unit configured to acquire authentication information provided by another terminal device configured to perform mobile communication in a mobile communication network; and an authentication execution unit configured to perform an authentication procedure for connecting to a wireless network different from the mobile communication network by using the authentication information. The authentication information includes information provided by a subscriber identity module of the other terminal device or information generated based on the information. The acquisition unit acquires at least some of the authentication information before the authentication procedure starts.

According to the present disclosure, there is provided an information processing device for a terminal device, the information processing device including: a memory configured to store a program; and at least one processor capable of executing the program. The program is a program that causes the processor to execute acquiring authentication information provided by another terminal device configured to perform mobile communication in a mobile communication network, and performing an authentication procedure for connecting to a wireless network different from the mobile communication network by using the authentication information. The authentication information includes information provided by a subscriber identity module of the other terminal device or information generated based on the information. The acquiring of the authentication information includes acquiring of at least some of the authentication information before the authentication procedure starts.

According to the present disclosure, there is provided a terminal device including: a mobile communication unit configured to perform mobile communication in a mobile communication network; an acquisition unit configured to acquire authentication information including information provided by a subscriber identity module of the terminal device or information generated based on the information; and a providing unit configured to provide the authentication information to another terminal device configured to perform an authentication procedure for connecting to a wireless network different from the mobile communication network by using the authentication information. The providing unit provides at least some of the authentication information to the other terminal device before the authentication procedure starts.

According to the present disclosure, there is provided an information processing device for a terminal device configured to perform mobile communication in a mobile communication network, the information processing device including: a memory configured to store a program; and at least one processor capable of executing the program. The program is a program that causes the processor to execute acquiring authentication information including information provided by a subscriber identity module of the terminal device or information generated based on the information, and providing the authentication information to another terminal device configured to perform an authentication procedure for connecting to a wireless network different from the mobile communication network by using the authentication information. The providing of the authentication information to the other terminal device includes providing of at least some of the authentication information to the other terminal device before the authentication procedure starts.

Advantageous Effects of Invention

As described above, according to the present disclosure, it is possible to further reduce a time that passes before communication by way of a wireless network starts. Note that the effect described above is not necessarily limitative, and along with the effect or instead of the effect, any effect disclosed in the present specification or other effects that can be understood from the present specification may be exhibited.

BRIEF DESCRIPTION OF DRAWINGS

FIG. 5 is a block diagram showing an example of a configuration of a mobile communication terminal according to the embodiment.

FIG. 6 is a sequence diagram showing a first example of a schematic flow of a communication control process according to the embodiment.

FIG. 7 is a sequence diagram showing a second example of a schematic flow of a communication control process according to the embodiment.

FIG. 8 is a sequence diagram showing an example of a schematic flow of a connection switch process according to the embodiment.

FIG. 9A is (the first half of) a sequence diagram showing an example of a schematic flow of a connection process according to the embodiment.

FIG. 9B is (the second half of) the sequence diagram showing the example of the schematic flow of the connection process according to the embodiment.

DESCRIPTION OF EMBODIMENT(S)

Figure 1:
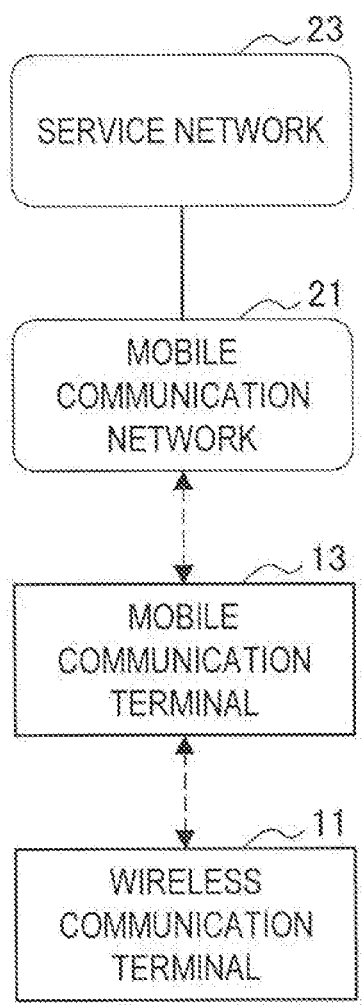
FIG. 1 is an explanatory diagram for describing an example of communication using tethering.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Introduction
2. Schematic configuration of a communication system
3. Configuration of each device
3.1. Configuration of a wireless communication terminal
3.2. Configuration of a mobile communication terminal
4. Process flow
5. Application examples
5.1. Application examples regarding a mobile communication terminal
5.2. Application example regarding a wireless communication terminal
5.3. Application example regarding an information management device
6. Summary 1. Introduction First, communication using tethering and communication by way of a WLAN will be described with reference to FIGS. 1 and 2.

Communication Using Tethering

A wireless communication terminal that performs wireless communication that conforms with WLAN communication (hereinafter, referred to as "WLAN communication") performs, for example, communication using tethering. In other words, the wireless communication terminal is connected to a mobile communication terminal to perform communication by way of the mobile communication terminal and a mobile communication network. A specific example of this subject will be described below with reference to FIG. 1.

FIG. 1 is an explanatory diagram for describing an example of communication using tethering. Referring to FIG. 1, a wireless communication terminal 11, a mobile communication terminal 13, a mobile communication network 21, and a service network 23 are shown. The wireless communication terminal 11 is, for example, a device that performs WLAN communication, and is a tablet terminal as an example. The mobile communication terminal 13 is a device that performs mobile communication on the mobile communication network 21, and is a smartphone as an example. The mobile communication network 21 is a network that conforms with a communication standard, for example, Long Term Evolution (LTE), LTE-Advanced, or the like. The service network 23 is a public network, for example, the Internet. The mobile communication terminal 13, for example, is connected to the mobile communication network 21 to perform transmission and reception of data by way of the mobile communication network 21. In addition, the mobile communication network 21 is connected to the service network 23, and thus the mobile communication terminal 13 can perform transmission and reception of data by way of the mobile communication network 21 and the service network 23. Furthermore, the wireless communication terminal 11 is connected to the mobile communication terminal 13, and performs transmission and reception of data by way of the mobile communication terminal 13 and the mobile communication network 21 (and the service network 23). In other words, the mobile communication terminal 13 has a function of performing relaying between the wireless communication terminal 11 and the mobile communication network 21. In this manner, the wireless communication terminal 11 performs communication using tethering, and the mobile communication terminal 13 has the tethering function.

A communication speed in the communication using tethering described above can be low due to a communication situation of the mobile communication terminal or a communication speed of the mobile communication thereof. In addition, radio resources consumed on the mobile communication network and power consumption of the mobile communication terminal can increase.

Communication by Way of a WLAN

A wireless communication terminal that performs WLAN communication, for example, is connected to a WLAN. In other words, the wireless communication terminal described above is connected to an access point of the WLAN. Thus, the wireless communication terminal performs transmission and reception of data by way of the WLAN (or the access point). A specific example of this subject will be described below with reference to FIG. 2.

Figure 2:
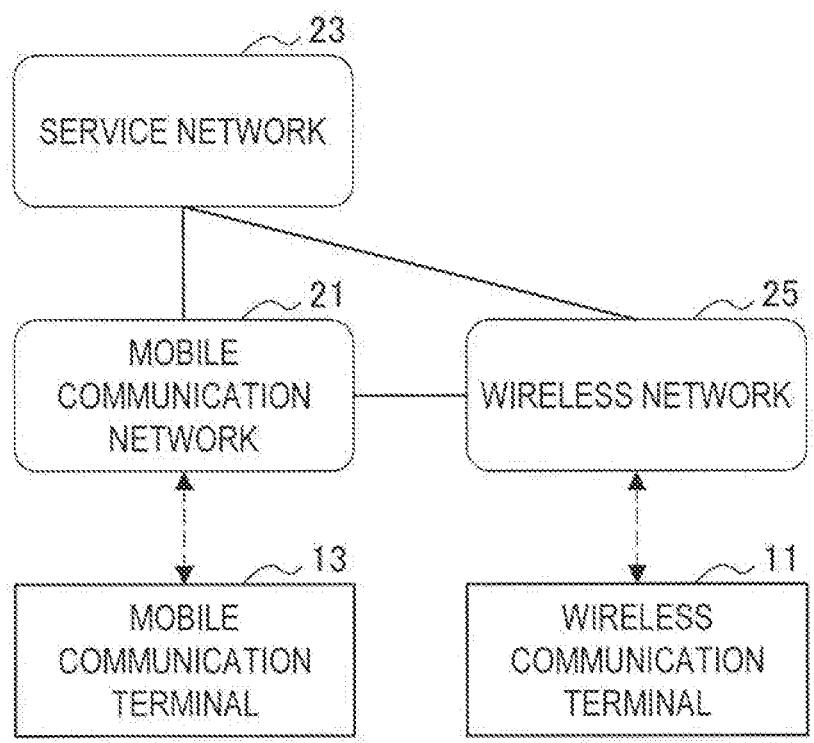
FIG. 2 is an explanatory diagram for describing an example of communication by way of a WLAN.

FIG. 2 is an explanatory diagram for describing an example of communication by way of a WLAN. Referring to FIG. 2, the wireless communication terminal 11, the mobile communication terminal 13, the mobile communication network 21, the service network 23, and a wireless network 25 are shown. The wireless network 25 is, for example, a WLAN. The wireless communication terminal 11 is connected to the wireless network 25 to perform transmission and reception of data by way of the wireless network 25. In addition, for example, the wireless network 25 is connected to the mobile communication network 21, and thus the wireless communication terminal 11 can perform transmission and reception of data by way of the wireless network 25 and the mobile communication network 21 (and the service network 23). Alternatively, the wireless network 25 is connected to the service network 23, and thus the wireless communication terminal 11 may perform transmission and reception of data by way of the wireless network 25 and the service network 23.

It is generally possible to perform communication by way of a WLAN only in a limited area (in other words, a communication area of a WLAN) as described above.

2. Schematic Configuration of a Communication System

Figure 3:
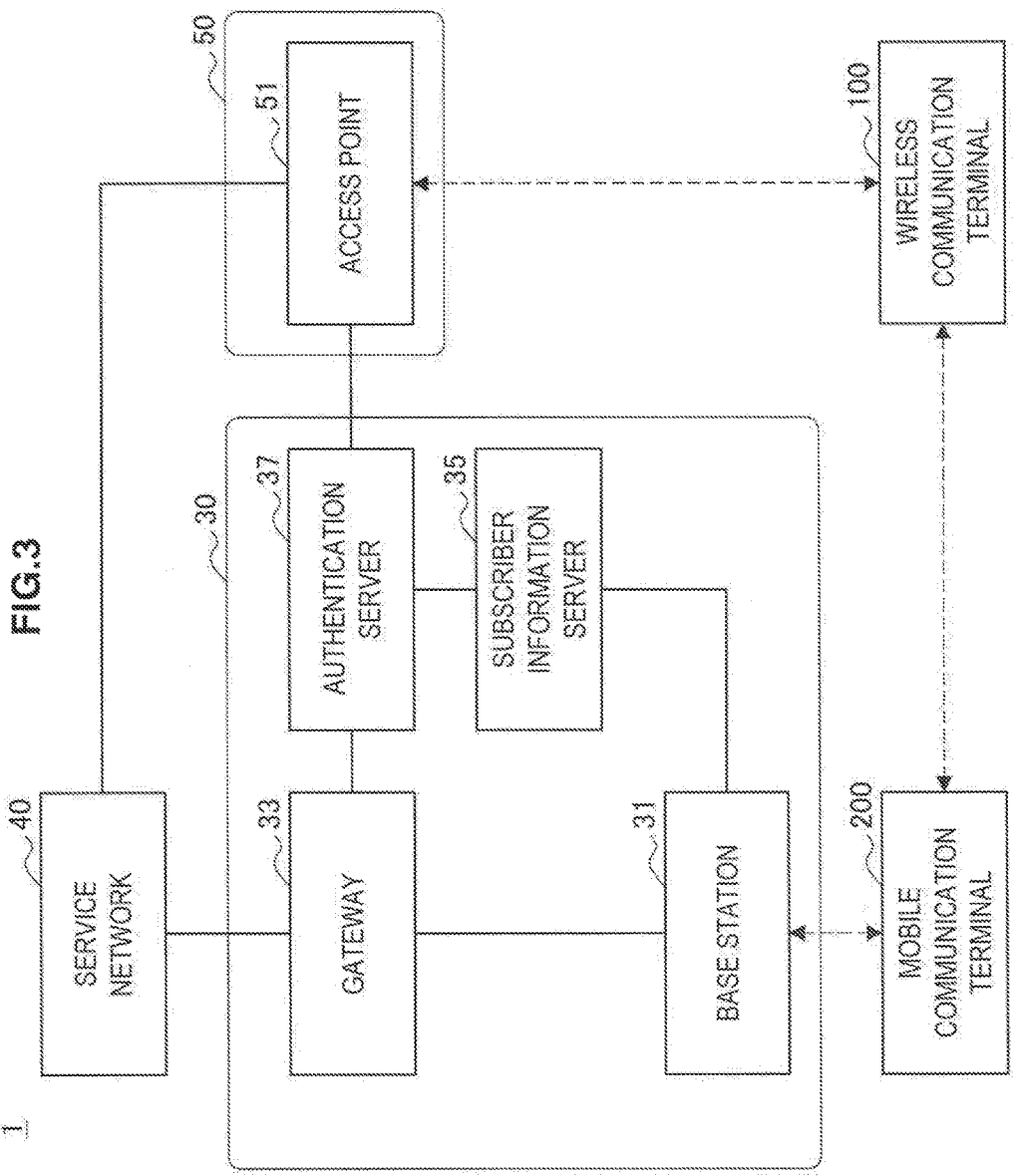
FIG. 3 is an explanatory diagram showing an example of a schematic configuration of a communication system according to an embodiment.

Next, a schematic configuration of a communication system 1 according to an embodiment of the present disclosure will be described with reference to FIG. 3. FIG. 3 is an explanatory diagram showing an example of a schematic configuration of the communication system 1 according to the embodiment of the present disclosure. Referring to FIG. 3, the communication system 1 includes a mobile communication network 30, a service network 40, a wireless network 50, a wireless communication terminal 100 and a mobile communication terminal 200.

(Mobile Communication Network 30)

The mobile communication network 30 is a network for mobile communication. The mobile communication network 30 is, for example, a network that conforms with any communication standard of Third Generation Partnership Project (3GPP). As an example, the mobile communication network 30 is a network that conforms with Long Term Evolution (LTE) or LTE-Advanced. The mobile communication network 30 is operated by, for example, a mobile communication service provider. Note that the mobile communication network 30 can also be called a cellular network. In addition, mobile communication can also be called cellular-type communication.

The mobile communication network 30 includes a radio access network (RAN) and a core network. In addition, the mobile communication network 30 includes a base station 31 on the radio access network, and includes a gateway 33, a subscriber information server 35, and an authentication server 37 on the core network.

Base Station 31

The base station 31 performs communication with a terminal device that performs mobile communication. For example, the base station 31 forms a cell that is a communication area of the mobile communication network 30 and communicates with a terminal device positioned within the cell. As an example, the base station 31 is an evolved Node B (eNB).

Gateway 33

The gateway 33 performs relaying between the mobile communication network 30 and another network. As an example, the gateway 33 is a packet data network gateway (P-GW). In addition, the other network is, for example, the service network 40.

Subscriber Information Server 35

The subscriber information server 35 retains subscriber information of the mobile communication network 30. For example, the subscriber information server 35 also retains information used in authentication for connection. The subscriber information server 35 is, for example, a home subscriber server (HSS).

Authentication Server 37

The authentication server 37 has an authentication function of authenticating subscribers of the mobile communication network 30 at the time of connection. The authentication server 37 is, for example, an authentication, authorization, and accounting (AAA) server.

(Service Network 40)

The service network 40 is a public network such as the Internet.

(Wireless Network 50)

The wireless network 50 is a wireless network different from the mobile communication network 30. For example, a communication scheme of the wireless network 50 is different from a communication scheme of the mobile communication network 30. In addition, for example, a service area of the wireless network 50 is smaller than a service area of the mobile communication network 30. More specifically, for example, the service area of the wireless network 50 is a discrete spot. As a specific example, the wireless network 50 is the WLAN.

Access Point 51

The access point 51 communicates with a terminal device configured to perform wireless communication (hereinafter referred to as "first wireless communication") according to the communication scheme of the wireless network 50. As a specific example, the wireless network 50 is the WLAN, the first wireless communication is WLAN communication, and the access point 51 communicates with the terminal device configured to perform WLAN communication. In addition, for example, the access point 51 communicates with a terminal device positioned in a communication area of the access point 51.

(Wireless Communication Terminal 100)

The wireless communication terminal 100 performs wireless communication, which is different from mobile communication.

In particular, the wireless communication terminal 100 performs the first wireless communication (that is, wireless communication according to the communication scheme of the wireless network 50). As a specific example, the first wireless communication is WLAN communication, and the wireless communication terminal 100 performs WLAN communication.

In addition, for example, the wireless communication terminal 100 further performs wireless communication (hereinafter referred to as "second wireless communication") according to another communication scheme different from the communication scheme of the wireless network 50. For example, the second wireless communication is near field communication. As a specific example, the other communication scheme is Bluetooth (registered trademark), the second wireless communication is wireless communication according to Bluetooth (hereinafter referred to as "Bluetooth communication"), and the wireless communication terminal 100 performs Bluetooth communication.

Furthermore, the wireless communication terminal 100 performs communication using tethering. In other words, the wireless communication terminal 100 performs communication by way of relaying performed by a terminal device (for example, the mobile communication terminal 200) that performs mobile communication. More specifically, for example, the wireless communication terminal 100 is connected to the mobile communication terminal 200 to perform transmission and reception of data by way of the mobile communication terminal 200 and the mobile communication network 30 (and the service network 40).

Note that the wireless communication terminal 100 does not have a communication function for mobile communication on the mobile communication network 30.

(Mobile Communication Terminal 200)

The mobile communication terminal 200 performs mobile communication on the mobile communication network 30. In other words, the mobile communication terminal 200 performs mobile communication in a service area of the mobile communication network 30. Specifically, the mobile communication terminal 200 communicates with, for example, the base station 31 when it is positioned within the cell of the base station 31.

In addition, the mobile communication terminal 200 performs wireless communication, which is different from mobile communication. For example, the mobile communication terminal 200 performs the first wireless communication (that is, wireless communication according to the communication scheme of the wireless network 50). As a specific example, the first wireless communication is WLAN communication, and the mobile communication terminal 200 performs WLAN communication. In addition, for example, the mobile communication terminal 200 further performs the second wireless communication (that is, wireless communication according to another communication scheme different from the communication scheme of the wireless network 50). For example, the second wireless communication is near field communication. As a specific example, the other communication scheme is Bluetooth, the second wireless communication is Bluetooth communication, and the mobile communication terminal 200 performs Bluetooth communication.

Furthermore, the mobile communication terminal 200 has a tethering function. That is, the mobile communication terminal 200 has the function of performing relaying between the mobile communication network 30 and another terminal device.

3. Configuration of Each Device

Figure 4:
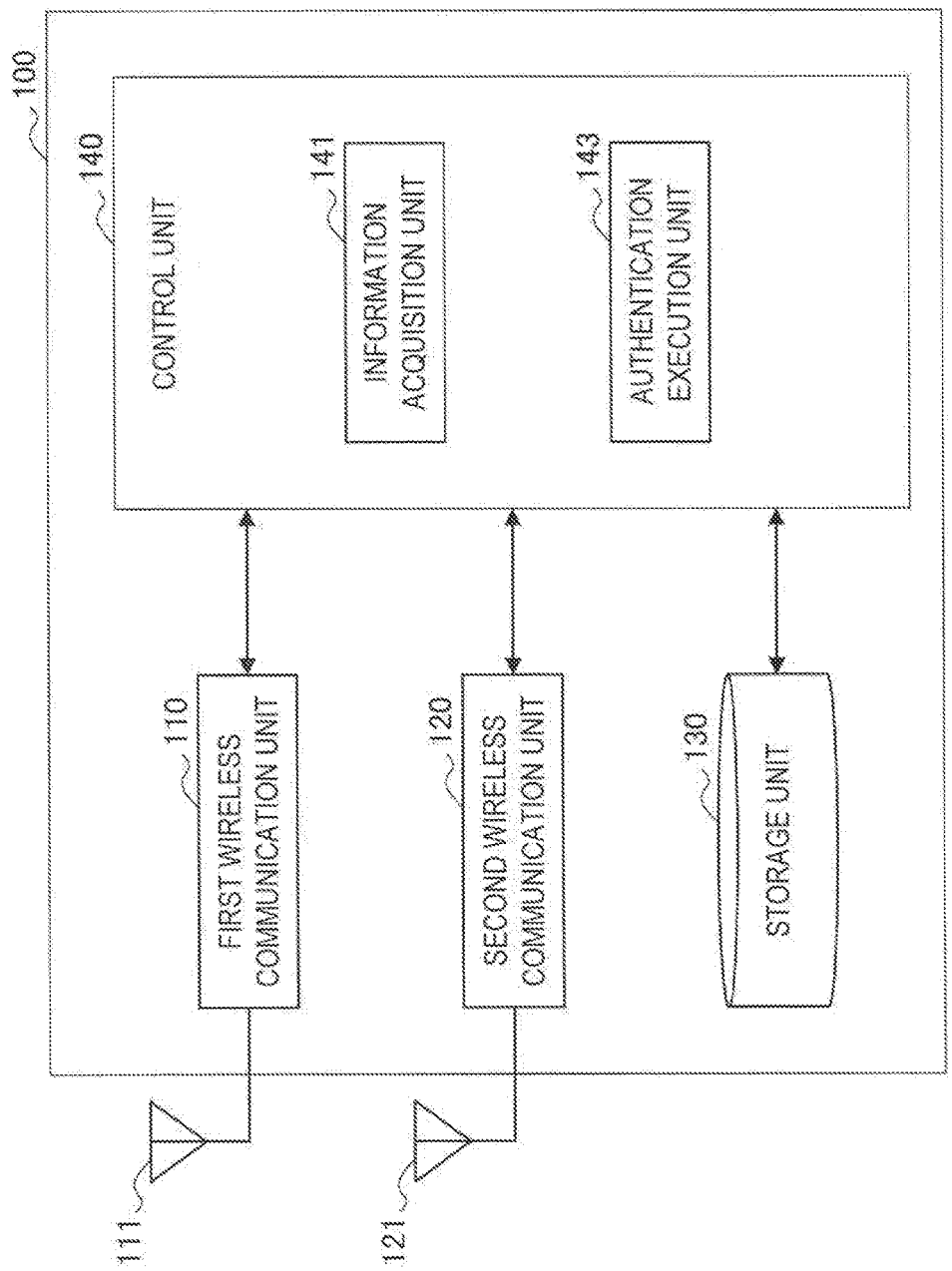
FIG. 4 is a block diagram showing an example of a configuration of a wireless communication terminal according to the embodiment.

Next, configurations of devices according to the embodiment will be described with reference to FIGS. 4 and 5.

3.1. Configuration of a Wireless Communication Terminal

An example of a configuration of the wireless communication terminal 100 according to the first embodiment of the present disclosure will be described with reference to FIG. 4. FIG. 4 is a block diagram showing the example of the configuration of the wireless communication terminal 100 according to the first embodiment. Referring to FIG. 4, the wireless communication terminal 100 is provided with a first wireless communication unit 110, an antenna unit 111, a second wireless communication unit 120, an antenna unit 121, a storage unit 130, and a control unit 140.

(First Wireless Communication Unit 110)

The first wireless communication unit 110 performs wireless communication (that is, the first wireless communication) according to the communication scheme of the wireless network 50. As a specific example, the wireless network 50 is WLAN, and the first wireless communication is WLAN communication. In addition, the communication scheme is, for example, any of IEEE 802.11 series (for example, IEEE 802.11a, 11b, 11g, 11n, 11ac and 11ad) or any of Wi-Fi standards.

For example, the first wireless communication unit 110 receives signals from the access point 51 and transmits signals to the access point 51. In addition, for example, in cases of device-to-device direct communication, the first wireless communication unit 110 receives signals from another terminal device and transmits signals to the other terminal device. The other terminal device is, for example, the mobile communication terminal 200.

(Antenna Unit 111)

The antenna unit 111 radiates, as radio waves, signals output from the first wireless communication unit 110 to the space. In addition, the antenna unit 111 converts radio waves of the space into signals and outputs the signals to the first wireless communication unit 110.

(Second Wireless Communication Unit 120)

The second wireless communication unit 120 performs wireless communication (that is, second wireless communication) according to another communication scheme different from the communication scheme of the wireless network 50. For example, the second wireless communication is near field communication. As a specific example, the other communication scheme is Bluetooth, the second wireless communication is Bluetooth communication, and the second wireless communication unit 120 performs Bluetooth communication.

For example, the second wireless communication unit 120 receives signals from another terminal device and transmits signals to the other terminal device. The other terminal device is, for example, the mobile communication terminal 200.

(Storage Unit 130)

The storage unit 130 temporarily or permanently stores programs and data for operations of the wireless communication terminal 100.

(Control Unit 140)

The control unit 140 provides various functions of the wireless communication terminal 100. The control unit 140 includes an information acquisition unit 141 and an authentication execution unit 143.

(Information Acquisition Unit 141)

The information acquisition unit 141 acquires authentication information provided by the mobile communication terminal 200.

Authentication Information

The authentication information includes information provided by a subscriber identity module (SIM) 240 of the mobile communication terminal 200 or information generated based on the information.

The authentication information is information used in an authentication procedure for connecting to the wireless network 50. As an example, the authentication procedure is an authentication procedure based on Extensible Authentication Protocol Method for 3rd Generation Authentication and Key Agreement (EAP-AKA). Needless to say, the authentication procedure may be an authentication procedure based on another authentication method (for example, EAP-AKA' or EAP-SIM).

In addition, the SIM 240 is, for example, a Universal Integrated Circuit Card (UICC). Needless to say, the SIM 240 may be a SIM of another type.

Identification Information

For example, the authentication information includes subscriber identification information for identifying a subscriber. As a specific example, the subscriber identification information is an International Mobile Subscriber Identity (IMSI).

In addition, for example, the subscriber identification information includes network information indicating the mobile communication network 30, and the authentication information includes information indicating a length of the network information. As a specific example, the information indicating the length is a length of a mobile network code (MNC).

For example, the IMSI includes a three-digit mobile country code (MCC), a two-digit or three-digit MNC, and a 10-digit mobile subscriber identification number (MSIN), and is expressed as follows.

$$<\text{MCC: 3 digits}><\text{MNC: 2 or 3 digits}><\text{MSIN: up to 10 digits}> \quad [\text{Math. 1}]$$

Note that the authentication information may include identification information generated based on the subscriber identification information instead of the subscriber identification information (for example, the IMSI) and the information indicating the length (for example, the length of the MNC). As an example, the identification information is an Identity to be provided to the network, and may be expressed as follows.

$$0<\text{IMSI}>@\text{wlan.mnc}<\text{MNC}>.\text{mcc}<\text{MCC}>.3\text{gppnetwork.org} \quad [\text{Math. 2}]$$

As an example, when the IMSI is 123456012345678, the Identity to be provided is expressed as follows.

$$0123456012345678@\text{wlan.mnc456.mcc123.3gppnetwork.org} \quad [\text{Math. 3}]$$

Information Generated in an Authentication Process

In addition, the authentication information includes, for example, information generated in the authentication process executed by the SIM 240 in the authentication procedure. As a specific example, the authentication information includes a response to a challenge, a message authentication code (MAC) and a session key.

Others

In addition, the authentication information may further include a Public Land Mobile Network (PLMN) priority list and/or a WLAN Specific Identifier (WSID) list.

Timing of Acquisition

Before the Authentication Procedure Starts

The information acquisition unit 141 acquires at least some of the authentication information before the authentication procedure starts.

For example, the at least some of the information includes the subscriber identification information (for example, the IMSI). In addition, for example, the subscriber identification information (for example, the IMSI) includes network information (for example, the MNC) indicating the mobile communication network 30. The at least some of the information includes information indicating a length of the network information (for example, the length of the MNC). That is, as a specific example, the information acquisition unit 141 acquires authentication information including the IMSI and the length of the MNC before the authentication procedure starts.

As an example of a specific timing, the mobile communication terminal 200 provides the at least some of the information to the wireless communication terminal 100 when instructing the wireless communication terminal 100 to switch communication, and the information acquisition unit 141 acquires the at least some of the information.

As another example of a specific timing, the mobile communication terminal 200 provides the at least some of the information to the wireless communication terminal 100 when communication using tethering starts, and the information acquisition unit 141 may acquire the at least some of the information. As an example, the wireless communication terminal 100 requests the provision of information from the mobile communication terminal 200 when communication using tethering starts, and the mobile communication terminal 200 may provide the at least some of the information to the wireless communication terminal 100.

Also, the at least some of the information may include identification information generated based on the subscriber identification information instead of the subscriber identification information (for example, the IMSI). As an example, the identification information may be the Identity to be provided to the network.

As described above, at least some of the authentication information is acquired before the authentication procedure starts. Therefore, for example, an amount of information transmitted and received between the wireless communication terminal 100 and the mobile communication terminal 200 after the authentication procedure starts is reduced. Therefore, a time necessary for the authentication procedure may be shortened. As a result, a time that passes before communication by way of the wireless network 50 starts may be further reduced.

In addition, the at least some of the information includes the subscriber identification information (for example, the IMSI) (and the information indicating a length of the network information (for example, the length of the MNC)) or may include the identification information (for example, the Identity) generated based on the subscriber identification information. Therefore, for example, without transmitting and receiving information between the wireless communication terminal 100 and the mobile communication terminal 200, the wireless communication terminal 100 can transmit a first message to the network. That is, the authentication procedure is further shortened. As a result, a time that passes before communication by way of the wireless network 50 starts may be further reduced.

After the Authentication Procedure Starts

For example, the information acquisition unit 141 acquires some of the authentication information after the authentication procedure starts.

For example, the some of the information includes information generated in the authentication process executed by the SIM 240 in the authentication procedure. As a specific example, the authentication information includes a response to challenge-response authentication, an MAC of message authentication and a session key.

Path of Acquisition

The information acquisition unit 141 acquires the authentication information through, for example, the first wireless communication (for example, WLAN communication) or the second wireless communication (for example, Bluetooth communication).

For example, the information acquisition unit 141 acquires the at least some of the information through the first wireless communication (for example, WLAN communication) before the authentication procedure starts. More specifically, for example, when communication using tethering is performed, the wireless communication terminal 100 and the mobile communication terminal 200 are connected to each other through the first wireless communication. Therefore, the at least some of the information is provided by the mobile communication terminal 200 through the first wireless communication before the authentication procedure starts and is acquired by the wireless communication terminal 100 (the information acquisition unit 141).

In addition, for example, the information acquisition unit 141 acquires the some of the authentication information through the second wireless communication (for example, Bluetooth communication) after the authentication procedure starts. More specifically, for example, when the authentication procedure starts, the wireless communication terminal 100 performs the first wireless communication with the access point 51. Therefore, the some of the information is provided by the mobile communication terminal 200 through the second wireless communication after the authentication procedure starts and is acquired by the wireless communication terminal 100 (the information acquisition unit 141). Accordingly, for example, it is possible to perform the authentication procedure without switching a communication partner of the first wireless communication. Therefore, a time that passes before communication by way of the wireless network 50 starts may be further reduced.

(Authentication Execution Unit 143)

The authentication execution unit 143 uses the authentication information and performs the authentication procedure for connecting to the wireless network 50.

As described above, as an example, the authentication procedure is an authentication procedure based on EAP-AKA. Needless to say, the authentication procedure may be an authentication procedure based on another authentication method (for example, EAP-AKA' or EAP-SIM).

For example, the authentication execution unit 143 generates identification information (for example, the Identity) based on the subscriber identification information (for example, the IMSI) and the information indicating a length of the network information (for example, the length of the MNC). Then, the authentication execution unit 143 provides the generated identification information to the network. Also, when the identification information (for example, the Identity) is provided by the mobile communication terminal 200, the authentication execution unit 143 may not generate the identification information.

In addition, for example, when information used in the authentication process executed by the SIM 240 in the authentication procedure is provided from the network to the wireless communication terminal 100, the authentication execution unit 143 provides the information to the mobile communication terminal 200. As a specific example, the information includes a challenge (for example, RAND) of challenge-response authentication, information (for example, an authentication token (AUTN)) for network authentication, and an MAC.

In addition, for example, when the information (that is, some of the authentication information) generated in the authentication process executed by the SIM 240 in the authentication procedure is acquired, the authentication execution unit 143 provides the information to the network. The information includes, for example, a response to challenge-response authentication, an MAC of message authentication and a session key.

3.2. Configuration of the Mobile Communication Terminal

First, an example of a configuration of a mobile communication terminal 200 according to the embodiment will be described with reference to FIG. 5. FIG. 5 is a block diagram showing the example of the configuration of the mobile communication terminal 200 according to the embodiment. Referring to FIG. 5, the mobile communication terminal 200 is provided with a mobile communication unit 210, an antenna unit 211, a first wireless communication unit 220, an antenna unit 221, a second wireless communication unit 230, an antenna unit 231, a SIM 240, a storage unit 250, and a control unit 260.

(Mobile Communication Unit 210)

The mobile communication unit 210 performs mobile communication in the mobile communication network 30. That is, the mobile communication unit 210 performs communication according to a communication scheme of the mobile communication network 30. For example, the communication standard supports mobile communication according to any communication standard of 3GPP. As a specific example, the communication standard is LTE or LTE-Advanced.

For example, the mobile communication unit 210 receives signals from the base station 31 and transmits signals to the base station 31.

(Antenna Unit 211)

The antenna unit 211 radiates, as radio waves, signals output from the mobile communication unit 210 to a space. In addition, the antenna unit 211 converts radio waves of the space into signals, and outputs the signals to the mobile communication unit 210.

(First Wireless Communication Unit 220)

The first wireless communication unit 220 performs wireless communication according to the communication scheme of the wireless network 50 (that is, the first wireless communication). As a specific example, the wireless network 50 is WLAN, and the first wireless communication is WLAN communication. In addition, the communication scheme is, for example, any of IEEE 802.11 series or any of Wi-Fi standards.

For example, the first wireless communication unit 220 receives signals from the access point 51 and transmits signals to the access point 51. In addition, for example, in cases of device-to-device direct communication, the first wireless communication unit 220 receives signals from another terminal device and transmits signals to the other terminal device. The other terminal device is, for example, the wireless communication terminal 100.

(Antenna Unit 221)

The antenna unit 221 radiates, as radio waves, signals output from the first wireless communication unit 220 to the space. In addition, the antenna unit 221 converts radio waves of the space into signals and outputs the signals to the first wireless communication unit 220.

(Second Wireless Communication Unit 230)

The second wireless communication unit 230 performs wireless communication (that is, the second wireless communication) according to another communication scheme different from the communication scheme of the wireless network 50. For example, the second wireless communication is near field communication. As a specific example, the other communication scheme is Bluetooth, the second wireless communication is Bluetooth communication, and the second wireless communication unit 230 performs Bluetooth communication.

For example, the second wireless communication unit 230 receives signals from the other terminal device and transmits signals to the other terminal device. The other terminal device is, for example, the wireless communication terminal 100.

(SIM 240)

The SIM 240 provides information used in the authentication procedure for connecting to the wireless network 50. In addition, the SIM 240 performs the authentication process in the authentication procedure.

For example, the SIM 240 stores the subscriber identification information (for example, the IMSI) for identifying a subscriber and provides the subscriber identification information. In addition, for example, the subscriber identification information includes network information (for example, the MNC) indicating the mobile communication network 30. The SIM 240 provides information indicating a length of the network information (for example, the length of the MNC). In addition, the SIM 240 may further provide a PLMN priority list and/or a WSID list.

In addition, for example, the SIM 240 performs challenge-response authentication. More specifically, for example, the SIM 240 generates a response to the provided challenge (for example, RAND). In addition, for example, the SIM 240 performs network authentication. More specifically, for example, the SIM 240 authenticates the network by verifying the provided information (for example, AUTN). In addition, the SIM 240 performs message authentication. More specifically, for example, the SIM 240 authenticates a message by verifying the provided MAC. In addition, for example, the SIM 240 generates an MAC for message authentication. In addition, for example, the SIM 240 generates a session key. Then, the SIM 240 provides the generated response, the MAC and session key.

Note that the SIM 240 is, for example, a UICC. Needless to say, the SIM 240 may be a SIM of another type.

(Storage Unit 250)

The storage unit 250 temporarily or permanently stores programs and data for operations of the mobile communication terminal 200.

(Control Unit 260)

The control unit 260 provides various functions of the mobile communication terminal 200. The control unit 260 includes an information acquisition unit 261 and an information providing unit 263.

(Information Acquisition Unit 261)

The information acquisition unit 261 acquires authentication information including information provided by the SIM 240 or information generated based on the information. Content of the authentication information is the same as that described in connection with the wireless communication terminal 100.

For example, when the SIM 240 provides information (for example, the subscriber identification information, and the information generated in the authentication process executed by the SIM 240), the information acquisition unit 261 acquires the information.

Note that the authentication information may also include information generated based on information provided by the SIM 240. In this case, the control unit 260 (for example, the information acquisition unit 261 or another component) generates information based on information provided by the SIM 240. The information acquisition unit 261 may acquire the generated information. As an example, the authentication information may include identification information (for example, the Identity) generated based on the subscriber identification information (for example, the IMSI). The control unit 260 may generate the identification information based on the subscriber identification information. Then, the information acquisition unit 261 may acquire the generated identification information.

(Information Providing Unit 263)

Providing Authentication Information to Wireless Communication Terminal 100

The information providing unit 263 provides the authentication information to the wireless communication terminal 100.

Timing of Provision

Before the Authentication Procedure Starts

The information providing unit 263 provides at least some of the authentication information to the wireless communication terminal 100 before the authentication procedure starts. Content of the at least some of the information provided to the wireless communication terminal 100 before the authentication procedure starts is the same as that described in connection with the wireless communication terminal 100.

As an example of a specific timing, the information providing unit 263 provides the at least some of the information to the wireless communication terminal 100 when instructing the wireless communication terminal 100 to switch communication.

As another example of a specific timing, the information providing unit 263 may provide the at least some of the information to the wireless communication terminal 100 when communication using tethering starts. As an example, the wireless communication terminal 100 requests the provision of information from the mobile communication terminal 200 when communication using tethering starts. The information providing unit 263 may provide the at least some of the information to the wireless communication terminal 100.

After the Authentication Procedure Starts

For example, the information providing unit 263 provides some of the authentication information after the authentication procedure starts. Content of the some of the information provided to the wireless communication terminal 100 after the authentication procedure starts is the same as that described in connection with the wireless communication terminal 100.

Path of Provision

The information providing unit 263 provides the authentication information through, for example, the first wireless communication (for example, WLAN communication) or the second wireless communication (for example, Bluetooth communication).

For example, the information providing unit 263 provides the at least some of the information to the wireless communication terminal 100 through the first wireless communication (for example, WLAN communication) before the authentication procedure starts. More specifically, for example, when communication using tethering is performed, the wireless communication terminal 100 and the mobile communication terminal 200 are connected to each other through the first wireless communication. Therefore, the at least some of the information is provided by the mobile communication terminal 200 (the information providing unit 263) to the wireless communication terminal 100 through the first wireless communication before the authentication procedure starts.

In addition, for example, the information providing unit 263 provides the some of the authentication information to the wireless communication terminal 100 through the second wireless communication (for example, Bluetooth communication) after the authentication procedure starts. More specifically, for example, when the authentication procedure starts, the wireless communication terminal 100 performs the first wireless communication with the access point 51. Therefore, the some of the information is provided by the mobile communication terminal 200 (the information providing unit 263) to the wireless communication terminal 100 through the second wireless communication after the authentication procedure starts.

Provision of Information to SIM 240

For example, information used in the authentication process executed by the SIM 240 in the authentication procedure is provided by the wireless communication terminal 100 to the mobile communication terminal 200. Then, the information providing unit 263 provides the information to the SIM 240. Content of the information is the same as that described in connection with the wireless communication terminal 100.

4. Process Flow

Next, an example of a communication control process according to the present embodiment will be described with reference to FIGS. 6 to 9B.

(First Example of the Communication Control Process)

FIG. 6 is a sequence diagram showing a first example of a schematic flow of a communication control process according to the present embodiment.

As a premise, for example, the wireless communication terminal 100 and the mobile communication terminal 200 are connected to each other in first wireless communication (for example, WLAN communication (direct communication)). In addition, the mobile communication terminal 200 is connected to the mobile communication network 30. Furthermore, the wireless communication terminal 100 performs communication using tethering by using the tethering function of the mobile communication terminal 200.

The mobile communication terminal 200 determines a communication switch from communication using tethering to communication by way of the wireless network 50 at any timing, and instructs the wireless communication terminal 100 regarding the switch (S1010). In this case, the mobile communication terminal 200 provides some of authentication information. As an example, the some of the information includes the IMSI and the length of the MNC.

Then, the wireless communication terminal 100 and the mobile communication terminal 200 perform a connection switch process for switching from connection of the first wireless communication (WLAN communication (direct communication)) to connection of second wireless communication (Bluetooth communication) (S1020). As a result, the wireless communication terminal 100 and the mobile communication terminal 200 are connected to each other in the second wireless communication (Bluetooth communication).

In addition, the wireless communication terminal 100 detects the wireless network 50 (S1030).

The wireless communication terminal 100 thereafter performs a connection process for connecting to the wireless network 50 (S1100). The connection process includes the authentication process for connecting to the wireless network 50.

(Second Example of the Communication Control Process)

FIG. 7 is a sequence diagram showing a second example of a schematic flow of a communication control process according to the present embodiment.

As a premise, for example, the wireless communication terminal 100 and the mobile communication terminal 200 are connected to each other in first wireless communication (for example, WLAN communication (direct communication)). In addition, the mobile communication terminal 200 is connected to the mobile communication network 30. Furthermore, the wireless communication terminal 100 starts communication using tethering by using the tethering function of the mobile communication terminal 200.

When communication using tethering starts, the wireless communication terminal 100 requests the provision of information from the mobile communication terminal 200 (S1040). Then, the mobile communication terminal 200 provides some of authentication information as a response to the request from the wireless communication terminal 100 (S1050). As an example, the some of the information includes the IMSI and the length of the MNC.

Then, the wireless communication terminal 100 determines a communication switch from communication using tethering to communication by way of the wireless network 50 at any timing (S1060).

Then, the wireless communication terminal 100 and the mobile communication terminal 200 perform a connection switch process for switching from connection of the first wireless communication (WLAN communication (direct communication)) to connection of second wireless communication (Bluetooth communication) (S1020). As a result, the wireless communication terminal 100 and the mobile communication terminal 200 are connected to each other in the second wireless communication (Bluetooth communication).

In addition, the wireless communication terminal 100 detects the wireless network 50 (S1070).

The wireless communication terminal 100 thereafter performs a connection process for connecting to the wireless network 50 (S1100). The connection process includes the authentication process for connecting to the wireless network 50.

(Connection Switch Process: S1020)

FIG. 8 is a sequence diagram showing an example of a schematic flow of the connection switch process according to the first embodiment. The connection switch process is a process for switching connection between the wireless communication terminal 100 and the mobile communication terminal 200 to switch from connection of the first wireless communication (for example, WLAN communication) to connection of the second wireless communication (for example, Bluetooth communication). In addition, the connection switch process corresponds to the process of Step S1020 shown in FIGS. 6 and 7.

As a premise, the wireless communication terminal 100 and the mobile communication terminal 200 are connected to each other in the first wireless communication (for example, WLAN communication (direct communication)).

First, the wireless communication terminal 100 transmits a connection process requesting message with regard to the second wireless communication to the mobile communication terminal 200 (S1021). Then, the mobile communication terminal 200 transmits a connection process responding message with regard to the second wireless communication to the wireless communication terminal 100 (S1022).

The wireless communication terminal 100 and the mobile communication terminal 200 thereafter switch the second wireless communication to an on state (S1023 and S1024). Then, the wireless communication terminal 100 and the mobile communication terminal 200 execute a connection process for connection of the second wireless communication (Bluetooth communication) (S1025). As a result, the wireless communication terminal 100 and the mobile communication terminal 200 are connected to each other in the second wireless communication (Bluetooth communication).

Furthermore, the wireless communication terminal 100 and the mobile communication terminal 200 execute a disconnection process for disconnecting the connection of the first wireless communication (WLAN (direct communication)) (S1026). As a result, the connection of the first wireless communication between the wireless communication terminal 100 and the mobile communication terminal 200 is disconnected. After the disconnection process, the wireless communication terminal 100 (for example, the control unit 260) may switch the function of the first wireless communication from an on-state to an off-state. In other words, the wireless communication terminal 100 may stop an operation of software or hardware for the first wireless communication. Accordingly, for example, the wireless communication terminal 100 transmits no beacon of the first wireless communication, and as a result, power consumption of the wireless communication terminal 100 can be reduced. Alternatively, after the disconnection process, the wireless communication terminal 100 (for example, the control unit 260) may further lengthen a transmission interval of beacons of the first wireless communication. Accordingly, for example, power consumption of the wireless communication terminal 100 can be reduced, and re-connection of the mobile communication terminal 200 to the wireless communication terminal 100 can be further quickly performed.

Note that the connection process requesting message with regard to the second wireless communication may be transmitted from the mobile communication terminal 200 to the wireless communication terminal 100, instead of being transmitted from the wireless communication terminal 100 to the mobile communication terminal 200. In this case, the connection process responding message with regard to the second wireless communication may be transmitted from the wireless communication terminal 100 to the mobile communication terminal 200, instead of being transmitted from the mobile communication terminal 200 to the wireless communication terminal 100.

(Connection Process: S1100)

FIGS. 9A and 9B are sequence diagrams showing an example of a schematic flow of a connection process according to the present embodiment. The connection process is a connection process for connecting to the wireless network 50. In this example, the connection process is a connection process through the authentication procedure based on EAP-AKA. The connection process corresponds to the process of Step S1100 illustrated in FIGS. 6 and 7.

First, the wireless communication terminal 100 detects the wireless network 50 (S1110).

The access point 51 of the wireless network 50 and the wireless communication terminal 100 thereafter perform association (Association) (S1121). Accordingly, transmission and reception of information for the authentication procedure becomes possible.

Then, the wireless communication terminal 100 transmits an EAPoL-Start message to the access point 51 (S1122). The authentication procedure based on EAP-AKA starts from this transmission.

The access point 51 transmits an EAP-Request/Identity message to the wireless communication terminal 100 (S1123). The EAP-Request/Identity message is a message requesting generation of Identity that is necessary for authentication of EAP-AKA.

The wireless communication terminal 100 generates an Identity based on some (for example, the IMSI and the length of the MNC) of authentication information acquired before the authentication procedure starts (S1125). Then, the wireless communication terminal 100 transmits an EAP-Response/Identity message including the generated Identity to the access point 51 (S1127).

The access point 51 thereafter transmits a RADIUS-Access-Request message that includes the Identity to the authentication server 37 (S1128).

Then, the authentication server 37 requests authentication vectors corresponding to the Identity from the subscriber information server 35 (S1129).

Then, the subscriber information server 35 generates authentication vectors corresponding to the Identity (S1130). Note that the authentication vectors refer to a set of information necessary for authenticating a terminal device. When an authentication scheme is EAP-AKA, the authentication vectors include a RAND, an AUTN, an XRES, an IK and a CK. The RAND is a random value used as a challenge. The AUTN is a value for a terminal device to authenticate a network. The XRES is a response value expected from a challenge. The IK is a key for verifying integrity of a message. The CK is a key for encrypting a message.

The subscriber information server 35 thereafter transmits the generated authentication vectors to the authentication server 37 (S1131).

Further, the authentication server 37 transmits a RAIDUS-Access-Challenge message to the access point 51 (S1132) in response to the RADIUS-Access-Request message (S1128). Note that the RAIDUS-Access-Challenge message includes a message authentication code (MAC) in addition to the authentication vectors. The MAC is information for verifying the integrity of the message and is generated by the authentication server 37.

The access point 51 thereafter transmits an EAP-Request/AKA-Challenge message to the wireless communication terminal 100 (S1133). The EAP-Request/AKA-Challenge message includes the RAND, the AUTN, and the MAC. The XRES, the IK, and the CK are retained by the access point 51 and are not transmitted to the wireless communication terminal 100.

Then, the wireless communication terminal 100 transmits a Request/AKA-Challenge message to the mobile communication terminal 200 (S1134). The Request/AKA-Challenge message is a message requesting the mobile communication terminal 200 to generate a response and session keys (IK and CK).

The mobile communication terminal 200 (or the SIM 240) thereafter executes an authentication algorithm (AKA algorithm) based on the information included in the Request/AKA-Challenge message (the RAND, the AUTN, and the MAC) (S1135). Accordingly, verification of the integrity of the message, authentication of a wireless network, and generation of a response to a challenge, the MAC, and the session keys are performed.

Then, the mobile communication terminal 200 transmits a Response/AKA-Challenge message to the wireless communication terminal 100 (S1136). The Response/AKA-Challenge message includes the generated response, MAC, and session keys.

The wireless communication terminal 100 thereafter transmits an EAP-Response/AKA-Challenge message to the access point 51 (S1137) in response to the EAP-Request/AKA-Challenge message (S1133). The EAP-Response/AKA-Challenge message includes the response and the MAC transmitted in S1136.

Then, the access point 51 transmits a RADIUS-Access-Request message (S1138). The RADIUS-Access-Request message includes the response and the MAC transmitted in S1137.

The authentication server 37 performs verification of the coincidence of the response and the XRSS and verification of the integrity of the message based on the MAC (S1139).

The authentication server 37 thereafter transmits a RADIUS-Access-Accept message to the access point 51 (S1140). The RADIUS-Access-Accept message is a message indicating permission for connection since a terminal device (i.e., the wireless communication terminal 100) that is subject to the authentication procedure is a legitimate user.

The access point 51 transmits an EAP-Success message to the wireless communication terminal 100 (S1141). The EAP-Success message is a message indicating success in authentication. In addition, the access point 51 transmits an EAPoL-Key message to the wireless communication terminal 100 (S1142). The EAPoL-Key message includes a key for encrypted communication used between the wireless communication terminal 100 and the access point 51.

The connection process is performed as described above. As a result, the wireless communication terminal 100 is connected to the wireless network 50.

5. Application Examples

The technology of the present disclosure is applicable to various kinds of products. For example, the mobile communication terminal 200 can be realized as a mobile terminal such as a smartphone, a tablet personal computer (PC), or a portable/dongle-type mobile router, or an in-vehicle terminal such as a car navigation device. In addition, the mobile communication terminal 200 can be realized as a terminal that performs machine-to-machine (M2M) communication (which is also called a machine-type communication (MTC) terminal). Further, the mobile communication terminal 200 can be a wireless communication module (for example, an integrated circuit module formed in one die) mounted in such a terminal.

In addition, the wireless communication terminal 100 can be realized as, for example, a mobile terminal such as a tablet PC, a notebook PC, a portable game terminal, or a digital camera, a fixed terminal such as a television receiver set, a printer, a digital scanner, or a network storage, or an in-vehicle terminal such as a car navigation device. In addition, the wireless communication terminal 100 can be realized as a terminal that performs M2M communication (which is also called an MTC terminal) such as a smart meter, a vending machine, a remote monitoring device, or a point-of-sale (POS) terminal. Further, the wireless communication terminal 100 can be a wireless communication module (for example, an integrated circuit module formed in one die) mounted in such a terminal.

5.1. Application Examples Regarding a Mobile Communication Terminal

First, a first application example (a smartphone 700) and a second application example (a car navigation device 730 and an in-vehicle system 760) regarding the mobile communication terminal 200 according to an embodiment of the present disclosure will be described.

(First Application Example)

Figure 10:
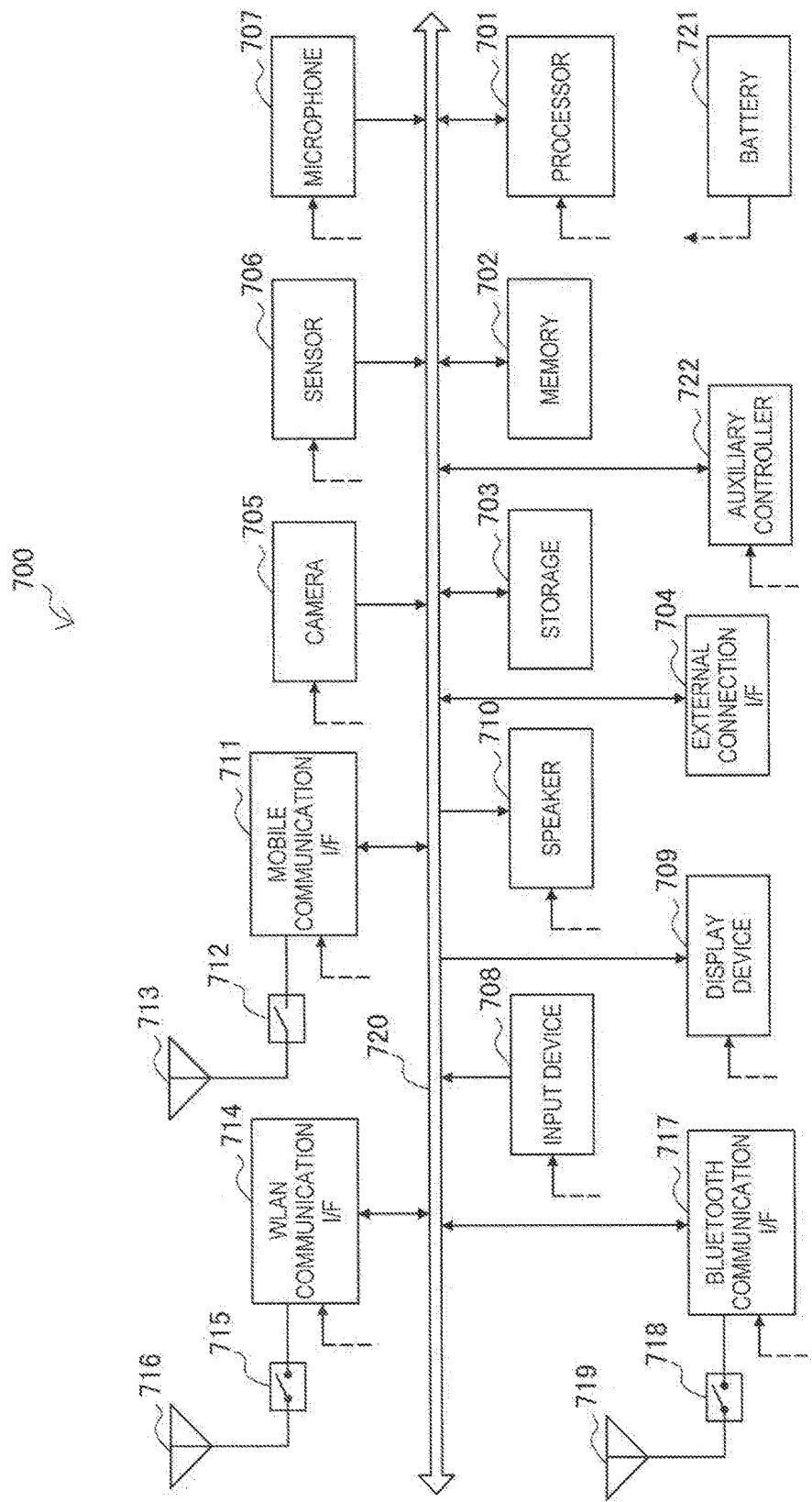
FIG. 10 is a block diagram showing an example of a schematic configuration of a smartphone.

FIG. 10 is a block diagram showing an example of a schematic configuration of the smartphone 700 to which the technology according to the present disclosure can be applied. The smartphone 700 includes a processor 701, a memory 702, a storage 703, an external connection interface 704, a camera 705, a sensor 706, a microphone 707, an input device 708, a display device 709, a speaker 710, a mobile communication interface 711, an antenna switch 712, an antenna 713, a WLAN communication interface 714, an antenna switch 715, an antenna 716, a Bluetooth communication interface 717, an antenna switch 718, an antenna 719, a bus 720, a battery 721, and an auxiliary controller 722.

The processor 701 may be, for example, a CPU or a System on Chip (SoC), and controls functions of an application layer and another layer of the smartphone 700. The memory 702 includes a RAM and a ROM, and stores a program that is executed by the processor 701, and data. The storage 703 may include a storage medium such as a semiconductor memory and a hard disk. The external connection interface 704 is an interface for connecting an external device such as a memory card and a universal serial bus (USB) device to the smartphone 700.

The camera 705 includes an image sensor such as a charge coupled device (CCD) and a complementary metal oxide semiconductor (CMOS), and generates a captured image. The sensor 706 may include a group of sensors such as a measurement sensor, a gyro sensor, a geomagnetic sensor, and an acceleration sensor. The microphone 707 converts sounds that are input to the smartphone 700 to audio signals. The input device 708 includes, for example, a touch sensor configured to detect touch onto a screen of the display device 709, a keypad, a keyboard, a button, or a switch, and receives an operation or an information input from a user. The display device 709 includes a screen such as a liquid crystal display (LCD) and an organic light-emitting diode (OLED) display, and displays an output image of the smartphone 700. The speaker 710 converts audio signals that are output from the smartphone 700 to sounds.

The mobile communication interface 711 supports a cellular communication scheme of either LTE or LTE-Advanced to execute wireless communication. The mobile communication interface 711 can typically include a baseband (BB) processor, a radio frequency (RF) circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 713. The mobile communication interface 711 may be a one-chip module in which a BB processor and an RF circuit are integrated. The mobile communication interface 711 may include a signal BB processor or a plurality of BB processors. In addition, the mobile communication interface 711 may include a signal RF circuit or a plurality of RF circuits. The antenna switch 712 switches connection destinations of the antenna 713 for a plurality of circuits included in the mobile communication interface 711. The antenna 713 has a single or a plurality of antenna elements (for example, a plurality of antenna elements constituting a multiple-input and multiple-output (MIMO) antenna) and is used by the mobile communication interface 711 to transmit and receive radio signals.

The WLAN communication interface 714 supports one or more WLAN standards such as IEEE 802.11a, 11b, 11g, 11n, 11ac, and 11ad to execute wireless communication. The WLAN communication interface 714 can communicate with another device via a WLAN access point in an infrastructure mode. In addition, the WLAN communication interface 714 can communicate directly with another device in an ad hoc mode. The WLAN communication interface 714 can typically include a BB processor and an RF circuit. The WLAN communication interface 714 may be a one-chip module in which a memory that stores a communication control program, a processor that executes the program, and a relevant circuit are integrated. The antenna switch 715 switches connection destinations of the antenna 716 for a plurality of circuits included in the WLAN communication interface 714. The antenna 716 has a single or a plurality of antenna elements (for example, a plurality of antenna elements constituting a MIMO antenna), and is used by the WLAN communication interface 714 to transmit and receive radio signals.

The Bluetooth communication interface 717 supports one or more Bluetooth standards to execute wireless communication. The Bluetooth communication interface 717 can communicate directly with another device. The Bluetooth communication interface 717 can typically include a BB processor, an RF circuit, and the like. The Bluetooth communication interface 717 may be a one-chip module in which a memory that stores a communication control program, a processor that executes the program, and a relevant circuit are integrated. The antenna switch 718 switches connection destinations of the antenna 719 for a plurality of circuits included in the Bluetooth communication interface 717. The antenna 719 has a single or a plurality of antenna elements, and is used by the Bluetooth communication interface 717 to transmit and receive radio signals.

As shown in FIG. 10, the smartphone 700 may have antennas that correspond to each of the mobile communication interface 711, the WLAN communication interface 714, and the Bluetooth communication interface 717. Note that the configuration is not limited to the example of FIG. 10, and the smartphone 700 may have an antenna shared by two or more of the mobile communication interface 711, the WLAN communication interface 714, and the Bluetooth communication interface 717. As an example, the smartphone 700 may have an antenna and antenna switch shared by the WLAN communication interface 714 and the Bluetooth communication interface 717 instead of including the antenna switch 715 and the antenna 716, and the antenna switch 718 and the antenna 719. In addition, the shared antenna may be connected to either of the WLAN communication interface 714 and the Bluetooth communication interface 717 using the antenna switch.

In addition, the smartphone 700 may have the mobile communication interface 711, the WLAN communication interface 714, and the Bluetooth communication interface 717 as separate modules as shown in FIG. 10. Note that the configuration is not limited to the example of FIG. 10, and the smartphone 700 may have a one-chip module that includes two or more of the mobile communication interface 711, the WLAN communication interface 714, and the Bluetooth communication interface 717. In this case, the smartphone 700 may include an antenna and antenna switch shared between the communication interfaces, or may include antennas corresponding to each of the communication interfaces.

Note that the antenna switch 712, the antenna switch 715, and the antenna switch 718 may be omitted from the configuration of the smartphone 700.

The bus 720 connects the processor 701, the memory 702, the storage 703, the external connection interface 704, the camera 705, the sensor 706, the microphone 707, the input device 708, the display device 709, the speaker 710, the mobile communication interface 711, the WLAN communication interface 714, the Bluetooth communication interface 717, and the auxiliary controller 722 to each other. The battery 721 supplies power to blocks of the smartphone 700 illustrated in FIG. 10 via feeder lines, which are partially shown as dashed lines in the drawing. The auxiliary controller 722 operates a minimum necessary function of the smartphone 700, for example, in a sleep mode.

The information acquisition unit 261 and the information providing unit 263 described with reference to FIG. 5 may be implemented by the processor 701 and/or the auxiliary controller 722 in the smartphone 700 shown in FIG. 10. More specifically, for example, the information acquisition unit 261 and the information providing unit 263 may be implemented by the processor 701 and/or the auxiliary controller 722 and a program executed by the processor 701 and/or the auxiliary controller 722 (for example, an operating system (OS), a device driver, and/or application software) (or a memory that stores the program). In addition, at least some of the functions may be implemented by the mobile communication interface 711, the WLAN communication interface 714, and/or the Bluetooth communication interface 717.

(Second Application Example)

Figure 11:
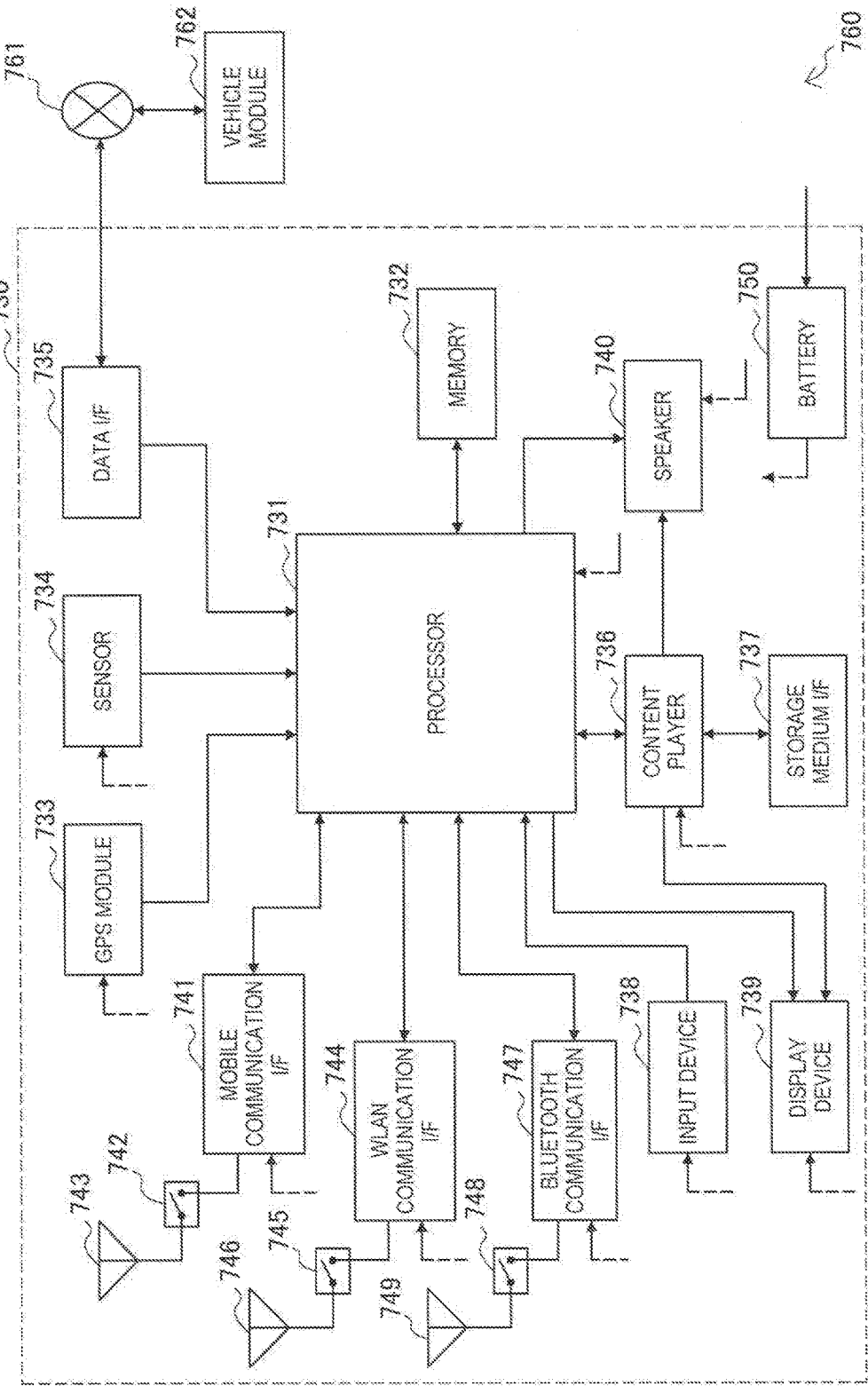
FIG. 11 is a block diagram showing an example of a schematic configuration of a car navigation device.

FIG. 11 is a block diagram showing an example of a schematic configuration of the car navigation device 730 to which the technology according to the present disclosure can be applied. The car navigation device 730 includes a processor 731, a memory 732, a Global Positioning System (GPS) module 733, a sensor 734, a data interface 735, a content player 736, a storage medium interface 737, an input device 738, a display device 739, a speaker 740, a mobile communication interface 741, an antenna switch 742, an antenna 743, a WLAN communication interface 744, an antenna switch 745, an antenna 746, a Bluetooth communication interface 747, an antenna switch 748, an antenna 749, and a battery 750.

The processor 731 may be, for example, a CPU or a SoC, and controls a navigation function and another function of the car navigation device 730. The memory 732 includes a RAM and a ROM, and stores a program that is executed by the processor 731, and data.

The GPS module 733 uses GPS signals received from a GPS satellite to measure a position (for example, latitude, longitude, and altitude) of the car navigation device 730. The sensor 734 may include a group of sensors such as a gyro sensor, a geomagnetic sensor, and an air pressure sensor. The data interface 735 is connected to, for example, an in-vehicle network 761 via a terminal that is not shown, and acquires data generated by the vehicle, such as vehicle speed data.

The content player 736 reproduces content stored in a storage medium (such as a CD and a DVD) that is inserted into the storage medium interface 737. The input device 738 includes, for example, a touch sensor configured to detect touch onto a screen of the display device 739, a button, or a switch, and receives an operation or an information input from a user. The display device 739 includes a screen such as a LCD or an OLED display, and displays an image of the navigation function or content that is reproduced. The speaker 740 outputs sounds of the navigation function or the content that is reproduced.

The mobile communication interface 741 supports a cellular communication scheme of either LTE or LTE-Advanced to execute wireless communication. The mobile communication interface 741 can typically include a BB processor, a RF circuit, or the like. The BB processor may execute, for example, encoding/decoding, modulation/demodulation, multiplexing/demultiplexing, or the like to execute various kinds of signal processing for wireless communication. Meanwhile, the RF circuit may include a mixer, a filter, an amplifier, or the like to transmit and receive radio signals via the antenna 743. The mobile communication interface 741 may be a one-chip module in which a BB processor and an RF circuit are integrated. The mobile communication interface 741 may include a signal BB processor or a plurality of BB processors. In addition, the mobile communication interface 741 may include a signal RF circuit or a plurality of RF circuits. The antenna switch 742 switches connection destinations of the antenna 743 for a plurality of circuits included in the mobile communication interface 741. The antenna 743 has a single or a plurality of antenna elements (for example, a plurality of antenna elements constituting a MIMO antenna) and is used by the mobile communication interface 741 to transmit and receive radio signals.

The WLAN communication interface 744 supports one or more WLAN standards such as IEEE 802.11a, 11b, 11g, 11n, 11ac, and 11ad to execute wireless communication. The WLAN communication interface 744 can communicate with another device via a WLAN access point in an infrastructure mode. In addition, the WLAN communication interface 744 can communicate directly with another device in an ad hoc mode. The WLAN communication interface 744 can typically include a BB processor and an RF circuit. The WLAN communication interface 744 may be a one-chip module in which a memory that stores a communication control program, a processor that executes the program, and a relevant circuit are integrated. The antenna switch 745 switches connection destinations of the antenna 746 for a plurality of circuits included in the WLAN communication interface 744. The antenna 746 has a single or a plurality of antenna elements (for example, a plurality of antenna elements constituting a MIMO antenna), and is used by the WLAN communication interface 744 to transmit and receive radio signals.

The Bluetooth communication interface 747 supports one or more Bluetooth standards to execute wireless communication. The Bluetooth communication interface 747 can communicate directly with another device. The Bluetooth communication interface 747 can typically include a BB processor, an RF circuit, and the like. The Bluetooth communication interface 747 may be a one-chip module in which a memory that stores a communication control program, a processor that executes the program, and a relevant circuit are integrated. The antenna switch 748 switches connection destinations of the antenna 749 for a plurality of circuits included in the Bluetooth communication interface 747. The antenna 749 has a single or a plurality of antenna elements, and is used by the Bluetooth communication interface 747 to transmit and receive radio signals.

As shown in FIG. 11, the car navigation device 730 may have antennas that correspond to each of the mobile communication interface 741, the WLAN communication interface 744, and the Bluetooth communication interface 747. Note that the configuration is not limited to the example of FIG. 11, and the car navigation device 730 may have an antenna shared by two or more of the mobile communication interface 741, the WLAN communication interface 744, and the Bluetooth communication interface 747. As an example, the car navigation device 730 may have an antenna and antenna switch shared by the WLAN communication interface 744 and the Bluetooth communication interface 747 instead of including the antenna switch 745 and the antenna 746, and the antenna switch 748 and the antenna 749. In addition, the shared antenna may be connected to either of the WLAN communication interface 744 and the Bluetooth communication interface 747 using the antenna switch.

In addition, the car navigation device 730 may have the mobile communication interface 741, the WLAN communication interface 744, and the Bluetooth communication interface 747 as separate modules as shown in FIG. 11. Note that the configuration is not limited to the example of FIG. 11, and the car navigation device 730 may have a one-chip module that includes two or more of the mobile communication interface 741, the WLAN communication interface 744, and the Bluetooth communication interface 747. In this case, the car navigation device 730 may include an antenna and antenna switch shared between the communication interfaces, or may include antennas corresponding to each of the communication interfaces.

Note that the antenna switch 742, the antenna switch 745, and the antenna switch 748 may be omitted from the configuration of the car navigation device 730.

The battery 750 supplies power to blocks of the car navigation device 730 shown in FIG. 11 via feeder lines that are partially shown as dashed lines in the drawing. The battery 750 accumulates power supplied form the vehicle.

The information acquisition unit 261 and the information providing unit 263 described with reference to FIG. 5 may be implemented by the processor 731 in the car navigation device 730 shown in FIG. 11. More specifically, for example, the information acquisition unit 261 and the information providing unit 263 may be implemented by the processor 731 and a program executed by the processor 731 (for example, an OS, a device driver, and/or application software) (or a memory that stores the program). In addition, at least some of the functions may be implemented by the mobile communication interface 741, the WLAN communication interface 744, and/or the Bluetooth communication interface 747.

In addition, the technology of the present disclosure may also be realized as an in-vehicle system (or a vehicle) 760 including one or more blocks of the car navigation device 730, the in-vehicle network 761, and a vehicle module 762. The vehicle module 762 generates vehicle data such as vehicle speed, engine speed, and trouble information, and outputs the generated data to the in-vehicle network 761.

5.2. Application Example Regarding a Wireless Communication Terminal

Next, a first application example (a tablet terminal 800) and a second application example (a car navigation device 830 and an in-vehicle system 860) regarding the wireless communication terminal 100 according to an embodiment of the present disclosure will be described.

(First Application Example)

Figure 12:
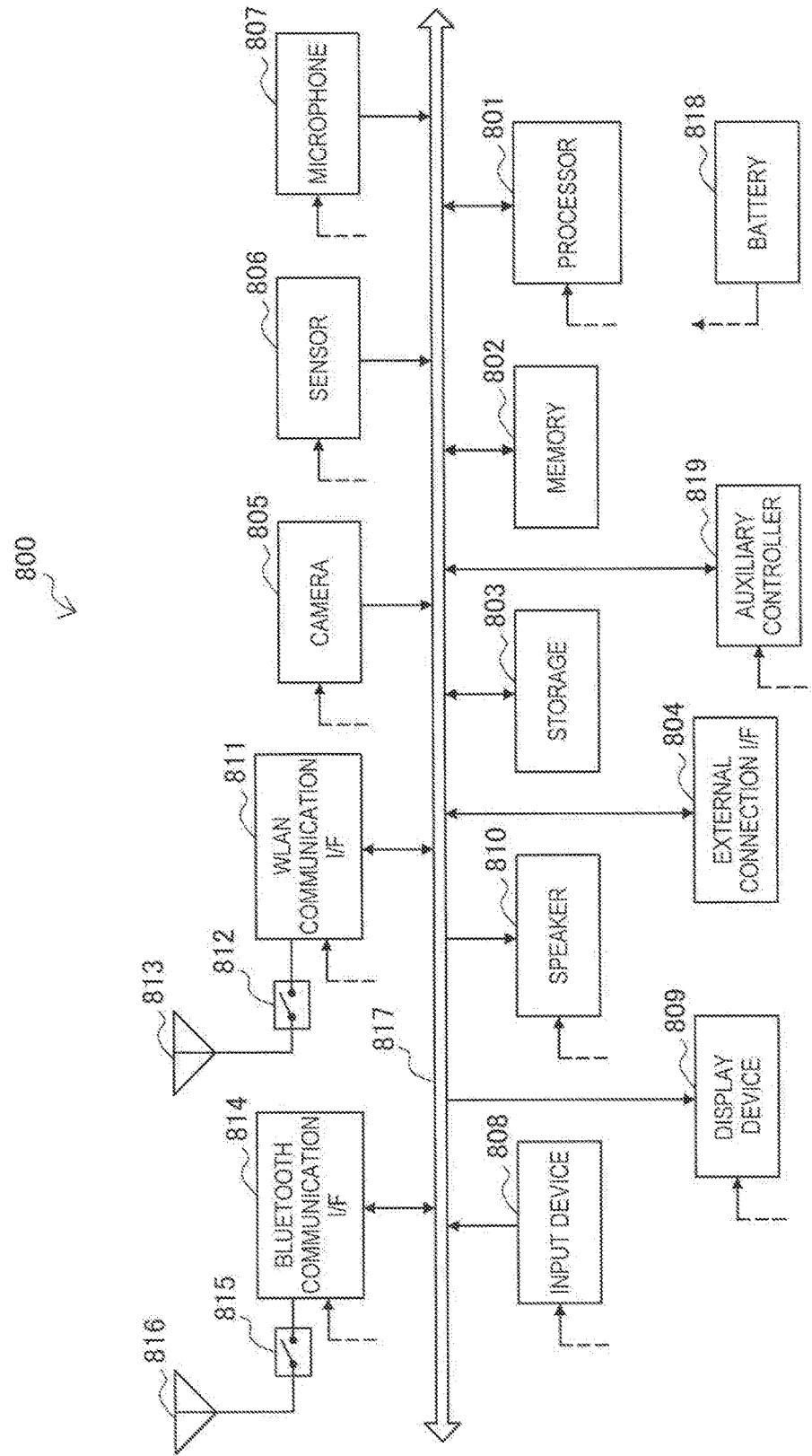
FIG. 12 is a block diagram showing an example of a schematic configuration of a tablet terminal.

FIG. 12 is a block diagram showing an example of a schematic configuration of the tablet terminal 800 to which the technology according to the present disclosure can be applied. The tablet terminal 800 includes a processor 801, a memory 802, a storage 803, an external connection interface 804, a camera 805, a sensor 806, a microphone 807, an input device 808, a display device 809, a speaker 810, a WLAN communication interface 811, an antenna switch 812, an antenna 813, a Bluetooth communication interface 814, an antenna switch 815, an antenna 816, a bus 817, a battery 818, and an auxiliary controller 819.

The processor 801 may be, for example, a CPU or a SoC, and controls functions of an application layer and another layer of the tablet terminal 800. The memory 802 includes a RAM and a ROM, and stores a program that is executed by the processor 801, and data. The storage 803 may include a storage medium such as a semiconductor memory and a hard disk. The external connection interface 804 is an interface for connecting an external device such as a memory card and a USB device to the tablet terminal 800.

The camera 805 includes an image sensor such as a CCD and a CMOS, and generates a captured image. The sensor 806 may include a group of sensors such as a measurement sensor, a gyro sensor, a geomagnetic sensor, and an acceleration sensor. The microphone 807 converts sounds that are input to the tablet terminal 800 to audio signals. The input device 808 includes, for example, a touch sensor configured to detect touch onto a screen of the display device 809, a keypad, a keyboard, a button, or a switch, and receives an operation or an information input from a user. The display device 809 includes a screen such as a liquid crystal display (LCD) and an organic light-emitting diode (OLED) display, and displays an output image of the tablet terminal 800. The speaker 810 converts audio signals that are output from the tablet terminal 800 to sounds.

The WLAN communication interface 811 supports one or more WLAN standards such as IEEE 802.11a, 11b, 11g, 11n, 11ac, and 11ad to execute wireless communication. The WLAN communication interface 811 can communicate with another device via a WLAN access point in an infrastructure mode. In addition, the WLAN communication interface 811 can communicate directly with another device in an ad hoc mode. The WLAN communication interface 811 can typically include a BB processor and an RF circuit. The WLAN communication interface 811 may be a one-chip module in which a memory that stores a communication control program, a processor that executes the program, and a relevant circuit are integrated. The antenna switch 812 switches connection destinations of the antenna 813 for a plurality of circuits included in the WLAN communication interface 811. The antenna 813 has a single or a plurality of antenna elements (for example, a plurality of antenna elements constituting a MIMO antenna), and is used by the WLAN communication interface 811 to transmit and receive radio signals.

The Bluetooth communication interface 814 supports one or more Bluetooth standards to execute wireless communication. The Bluetooth communication interface 814 can communicate directly with another device. The Bluetooth communication interface 814 can typically include a BB processor, an RF circuit, and the like. The Bluetooth communication interface 814 may be a one-chip module in which a memory that stores a communication control program, a processor that executes the program, and a relevant circuit are integrated. The antenna switch 815 switches connection destinations of the antenna 816 for a plurality of circuits included in the Bluetooth communication interface 814. The antenna 816 has a single or a plurality of antenna elements, and is used by the Bluetooth communication interface 814 to transmit and receive radio signals.

As shown in FIG. 12, the tablet terminal 800 may have antennas that correspond to each of the WLAN communication interface 811, and the Bluetooth communication interface 814. Note that the configuration is not limited to the example of FIG. 12, and the tablet terminal 800 may have an antenna shared by the WLAN communication interface 811, and the Bluetooth communication interface 814. Specifically, the tablet terminal 800 may have an antenna and antenna switch shared by the WLAN communication interface 811 and the Bluetooth communication interface 814 instead of including the antenna switch 812 and the antenna 813, and the antenna switch 815 and the antenna 816. In addition, the shared antenna may be connected to either of the WLAN communication interface 811 and the Bluetooth communication interface 814 using the antenna switch.

In addition, the tablet terminal 800 may have the WLAN communication interface 811, and the Bluetooth communication interface 814 as separate modules as shown in FIG. 12. Note that the configuration is not limited to the example of FIG. 12, and the tablet terminal 800 may have a one-chip module that includes the WLAN communication interface 811, and the Bluetooth communication interface 814. In this case, the tablet terminal 800 may include an antenna and antenna switch shared between the communication interfaces, or may include antennas corresponding to each of the communication interfaces.

Note that the antenna switch 812, the antenna switch 815, and the antenna switch 718 may be omitted from the configuration of the tablet terminal 800.

The bus 820 connects the processor 801, the memory 802, the storage 803, the external connection interface 804, the camera 805, the sensor 806, the microphone 807, the input device 808, the display device 809, the speaker 810, the WLAN communication interface 811, the Bluetooth communication interface 814, and the auxiliary controller 819 to each other. The battery 818 supplies power to blocks of the tablet terminal 800 illustrated in FIG. 12 via feeder lines, which are partially shown as dashed lines in the drawing. The auxiliary controller 819 operates a minimum necessary function of the tablet terminal 800, for example, in a sleep mode.

The information acquisition unit 141 and the authentication execution unit 143 described with reference to FIG. 4 may be implemented by the processor 801 and/or the auxiliary controller 819 in the tablet terminal 800 shown in FIG. 12. More specifically, for example, the information acquisition unit 141 and the authentication execution unit 143 may be implemented by the processor 801 and/or the auxiliary controller 819 and a program executed by the processor 801 and/or the auxiliary controller 819 (for example, an OS, a device driver, and/or application software) (or a memory that stores the program).

Note that the tablet terminal 800 may operate as a wireless access point (software AP) as the processor 801 executes an access point function at an application level. In addition, the WLAN communication interface 811 may have a wireless access point function.

(Second Application Example)

Figure 13:
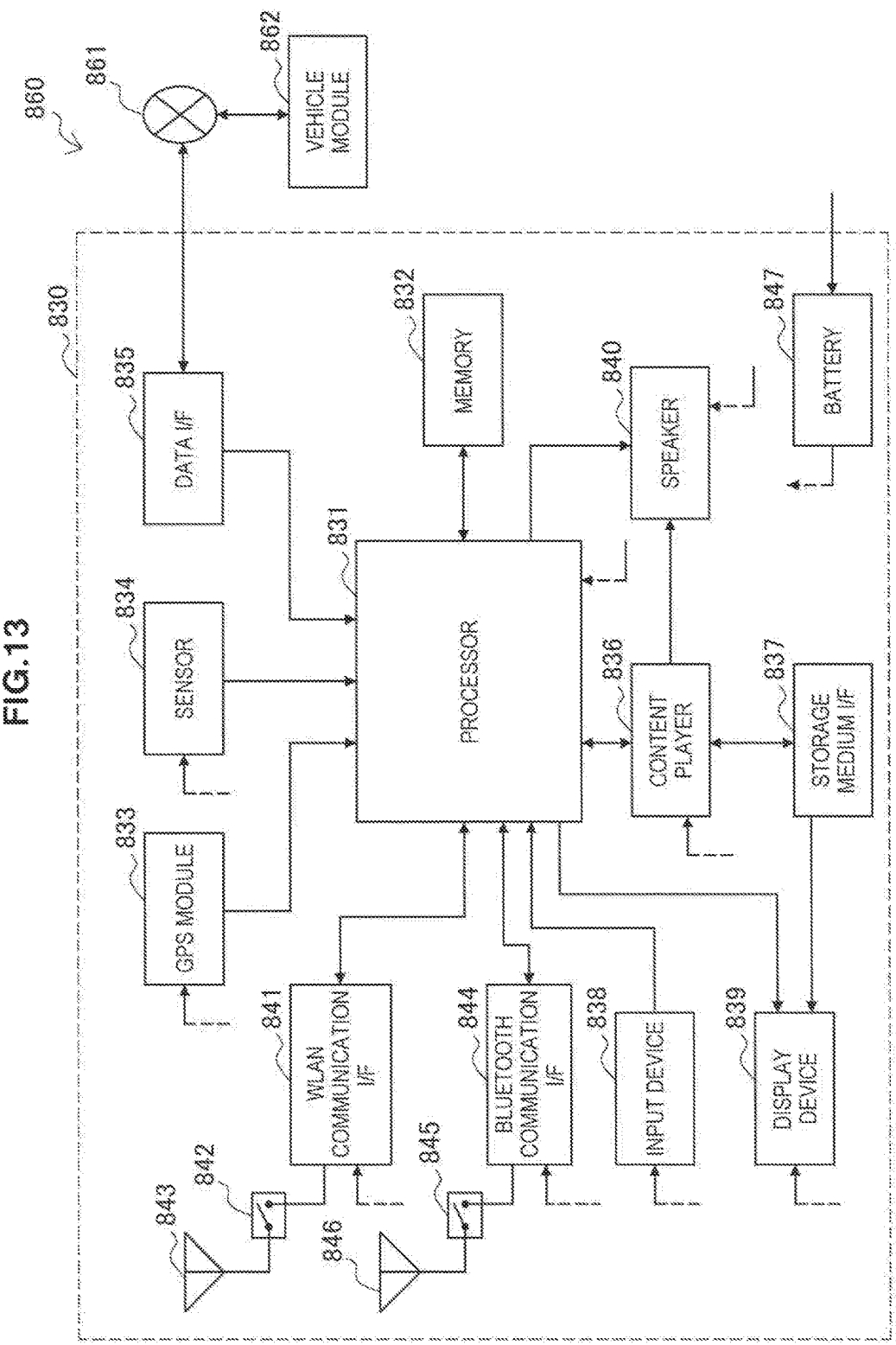
FIG. 13 is a block diagram showing an example of a schematic configuration of a car navigation device.

FIG. 13 is a block diagram showing an example of a schematic configuration of the car navigation device 830 to which the technology of the present disclosure can be applied. The car navigation device 830 includes a processor 831, a memory 832, a GPS module 833, a sensor 834, a data interface 835, a content player 836, a storage medium interface 837, an input device 838, a display device 839, a speaker 840, a WLAN communication interface 841, an antenna switch 842, an antenna 843, a Bluetooth communication interface 844, an antenna switch 845, an antenna 846 and a battery 847.

The processor 831 may be, for example, a CPU or a SoC, and controls a navigation function and another function of the car navigation device 730. The memory 832 includes a RAM and a ROM, and stores a program that is executed by the processor 831, and data.

The GPS module 833 uses GPS signals received from a GPS satellite to measure a position (for example, latitude, longitude, and altitude) of the car navigation device 830. The sensor 834 may include a group of sensors such as a gyro sensor, a geomagnetic sensor, and an air pressure sensor. The data interface 835 is connected to, for example, an in-vehicle network 861 via a terminal that is not shown, and acquires data generated by the vehicle, such as vehicle speed data.

The content player 836 reproduces content stored in a storage medium (such as a CD and a DVD) that is inserted into the storage medium interface 837. The input device 838 includes, for example, a touch sensor configured to detect touch onto a screen of the display device 839, a button, or a switch, and receives an operation or an information input from a user. The display device 839 includes a screen such as a LCD or an OLED display, and displays an image of the navigation function or content that is reproduced. The speaker 840 outputs sounds of the navigation function or the content that is reproduced.

The WLAN communication interface 841 supports one or more WLAN standards such as IEEE 802.11a, 11b, 11g, 11n, 11ac, and 11ad to execute wireless communication. The WLAN communication interface 841 can communicate with another device via a WLAN access point in an infrastructure mode. In addition, the WLAN communication interface 841 can communicate directly with another device in an ad hoc mode. The WLAN communication interface 841 can typically include a BB processor and an RF circuit. The WLAN communication interface 841 may be a one-chip module in which a memory that stores a communication control program, a processor that executes the program, and a relevant circuit are integrated. The antenna switch 842 switches connection destinations of the antenna 843 for a plurality of circuits included in the WLAN communication interface 841. The antenna 843 has a single or a plurality of antenna elements (for example, a plurality of antenna elements constituting a MIMO antenna), and is used by the WLAN communication interface 811 to transmit and receive radio signals.

The Bluetooth communication interface 844 supports one or more Bluetooth standards to execute wireless communication. The Bluetooth communication interface 844 can communicate directly with another device. The Bluetooth communication interface 844 can typically include a BB processor, an RF circuit, and the like. The Bluetooth communication interface 844 may be a one-chip module in which a memory that stores a communication control program, a processor that executes the program, and a relevant circuit are integrated. The antenna switch 845 switches connection destinations of the antenna 846 for a plurality of circuits included in the Bluetooth communication interface 844. The antenna 846 has a single or a plurality of antenna elements, and is used by the Bluetooth communication interface 844 to transmit and receive radio signals.

As shown in FIG. 13, the tablet terminal 800 may have antennas that correspond to each of the WLAN communication interface 841, and the Bluetooth communication interface 844. Note that the configuration is not limited to the example of FIG. 13, and the car navigation device 830 may have an antenna shared by the WLAN communication interface 841, and the Bluetooth communication interface 844. Specifically, the car navigation device 830 may have an antenna and antenna switch shared by the WLAN communication interface 841 and the Bluetooth communication interface 844 instead of including the antenna switch 842 and the antenna 843, and the antenna switch 845 and the antenna 846. In addition, the shared antenna may be connected to either of the WLAN communication interface 841 and the Bluetooth communication interface 844 using the antenna switch.

In addition, the car navigation device 830 may have the WLAN communication interface 841, and the Bluetooth communication interface 844 as separate modules as shown in FIG. 13. Note that the configuration is not limited to the example of FIG. 13, and the car navigation device 830 may have a one-chip module that includes the WLAN communication interface 841, and the Bluetooth communication interface 844. In this case, the car navigation device 830 may include an antenna and antenna switch shared between the communication interfaces, or may include antennas corresponding to each of the communication interfaces.

Note that the antenna switch 842, the antenna switch 845, and the antenna switch 748 may be omitted from the configuration of the car navigation device 830.

The battery 847 supplies power to blocks of the car navigation device 830 illustrated in FIG. 13 via feeder lines that are partially shown as dashed lines in the drawing. The battery 847 accumulates power supplied form the vehicle.

The information acquisition unit 141 and the authentication execution unit 143 described with reference to FIG. 4 may be implemented by the processor 831 in the car navigation device 830 shown in FIG. 13. More specifically, for example, the information acquisition unit 141 and the authentication execution unit 143 may be implemented by the processor 831 and a program executed by the processor 831 (for example, an OS, a device driver, and/or application software) (or a memory that stores the program). In addition, at least some of the functions may be implemented by the WLAN communication interface 841, and/or the Bluetooth communication interface 844.

In addition, the technology of the present disclosure may also be realized as an in-vehicle system (or a vehicle) 860 including one or more blocks of the car navigation device 830, the in-vehicle network 861, and a vehicle module 862. The vehicle module 862 generates vehicle data such as vehicle speed, engine speed, and trouble information, and outputs the generated data to the in-vehicle network 861.

6. Conclusion

So far, devices and processes according to the embodiments of the present disclosure have been described with reference to FIGS. 2 to 13.

In the embodiments according to the present disclosure, the wireless communication terminal 100 includes the information acquisition unit 141 configured to acquire authentication information provided by the mobile communication terminal 200 and the authentication execution unit 143 configured to perform the authentication procedure for connecting to the wireless network 50 using the authentication information. The authentication information includes information provided by the SIM 240 of the mobile communication terminal 200 or information generated based on the information. The information acquisition unit 141 acquires at least some of the authentication information before the authentication procedure starts.

In addition, in the embodiments according to the present disclosure, the mobile communication terminal 200 includes the mobile communication unit 210 configured to perform mobile communication in the mobile communication network 30, the information acquisition unit 261 configured to acquire authentication information including information provided by the SIM 240 or information generated based on the information, and the information providing unit 263 configured to provide the authentication information to the wireless communication terminal 100. The information providing unit 263 provides at least some of the authentication information to the wireless communication terminal 100 before the authentication procedure starts.

Therefore, for example, an amount of information transmitted and received between the wireless communication terminal 100 and the mobile communication terminal 200 after the authentication procedure starts is reduced. Therefore, a time necessary for the authentication procedure may be shortened. As a result, a time that passes before communication by way of the wireless network 50 starts may be further reduced.

Authentication Information

For example, the at least some of the information includes subscriber identification information (for example, the IMSI) for identifying a subscriber. In addition, for example, the subscriber identification information includes network information indicating the mobile communication network 30. The at least some of the information includes information indicating a length of the network information (for example, the length of the MNC).

Alternatively, the at least some of the information may also include identification information (for example, the Identity) generated based on the subscriber identification information (for example, the IMSI) for identifying a subscriber.

Therefore, for example, without transmitting and receiving information between the wireless communication terminal 100 and the mobile communication terminal 200, the wireless communication terminal 100 can transmit a first message to the network. That is, the authentication procedure is further shortened. As a result, a time that passes before communication by way of the wireless network 50 starts may be further reduced.

Provision of Information and Path of Acquisition

For example, the information providing unit 263 of the mobile communication terminal 200 provides some of the authentication information to the wireless communication terminal 100 through wireless communication of a communication scheme (for example, Bluetooth) different from a communication scheme with regard to the wireless network 50 after the authentication procedure starts.

In addition, for example, the information acquisition unit 141 of the wireless communication terminal 100 acquires some of the authentication information through wireless communication according to another communication scheme (for example, Bluetooth) different from the communication scheme of the wireless network 50 after the authentication procedure starts.

Therefore, for example, the wireless communication terminal 100 can perform the authentication procedure without switching a communication partner of the wireless communication (for example, WLAN communication). Therefore, a time that passes before communication by way of the wireless network 50 starts may be further reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

While an example in which, for example, the mobile communication terminal provides at least some of authentication information through first wireless communication (for example, WLAN communication) before the authentication procedure starts, and the wireless communication terminal acquires the at least some of the information through the first wireless communication before the authentication procedure starts has been described, the present disclosure is not limited to the example. The at least some of the information may be provided and acquired through the second wireless communication (for example, Bluetooth communication) instead of the first wireless communication before the authentication procedure starts.

In addition, while an example in which, for example, the mobile communication terminal provides some of authentication information through the second wireless communication (for example, Bluetooth communication) after the authentication procedure starts, and the wireless communication terminal acquires some of the information through the second wireless communication after the authentication procedure starts has been described, the present disclosure is not limited to the example. The some of the information may be provided and acquired through the first wireless communication (for example, WLAN communication) instead of the second wireless communication after the authentication procedure starts.

In addition, while an example in which the wireless network is the WLAN, and the first wireless communication (that is, wireless communication according to a communication scheme of the wireless network) is WLAN communication has been described, the present disclosure is not limited to the example. The wireless network may be a network other than the WLAN, and the first wireless communication may be communication other than the WLAN communication.

In addition, while an example in which the second wireless communication (that is, wireless communication according to another communication scheme different from a communication scheme of the wireless network) is Bluetooth communication has been described, the present disclosure is not limited to the example. The second wireless communication may be near field communication other than the Bluetooth communication or communication other than the near field communication.

In addition, while an example in which the authentication server is the AAA server has been described, the present disclosure is not limited to the example. The authentication server may be an authentication server of another type (for example, a Remote Authentication Dial In User Service (RADIUS) server).

In addition, processing steps in each process of the present specification are not necessarily executed in the orders described in the flowcharts in a time-series manner. The processing steps in each process may be executed, for example, in a different order from the orders described in the flowcharts or may be executed in parallel.

In addition, a computer program for causing hardware such as a CPU, a ROM, and a RAM installed in a terminal device according to the present disclosure (a wireless communication terminal and a mobile communication terminal) to exhibit the same function as each configuration of the terminal device can also be created. In addition, a storage medium to store the computer program may also be provided. In addition, an information processing device (for example, a processing circuit or a chip) that includes a memory (for example, a ROM and a RAM) that stores the computer program and one or more processors (for example, a CPU, a DSP, etc.) that can execute the computer program may also be provided.

In addition, the effects described in the present specification are merely illustrative or exemplary, and are not limitative. In other words, the technology according to the present disclosure can exhibit, along with or instead of the effects, other effects that are apparent to those skilled in the art based on the present specification.

Additionally, the present technology may also be configured as below.

(1) A terminal device including:
an acquisition unit configured to acquire authentication information provided by another terminal device configured to perform mobile communication in a mobile communication network; and
an authentication execution unit configured to perform an authentication procedure for connecting to a wireless network different from the mobile communication network by using the authentication information,
wherein the authentication information includes information provided by a subscriber identity module of the other terminal device or information generated based on the information, and
wherein the acquisition unit acquires at least some of the authentication information before the authentication procedure starts.

(2) The terminal device according to (1),
wherein the at least some of the information includes subscriber identification information for identifying a subscriber.

(3) The terminal device according to (2),
wherein the subscriber identification information includes network information indicating the mobile communication network, and
wherein the at least some of the information includes information indicating a length of the network information.

(4) The terminal device according to (1),
wherein the at least some of the information includes identification information generated based on subscriber identification information for identifying a subscriber.

(5) The terminal device according to any one of (1) to (4),
wherein the acquisition unit acquires some of the authentication information through wireless communication according to another communication scheme different from a communication scheme of the wireless network after the authentication procedure starts.

(6) The terminal device according to (5),
wherein the wireless communication is near field communication.

(7) The terminal device according to any one of (1) to (6),
wherein the wireless network is a wireless local area network (WLAN).

(8) An information processing device for a terminal device, the information processing device including:
a memory configured to store a program; and
at least one processor capable of executing the program,
wherein the program is a program that causes the processor to execute
acquiring authentication information provided by another terminal device configured to perform mobile communication in a mobile communication network, and
performing an authentication procedure for connecting to a wireless network different from the mobile communication network by using the authentication information,
wherein the authentication information includes information provided by a subscriber identity module of the other terminal device or information generated based on the information, and
wherein the acquiring of the authentication information includes acquiring of at least some of the authentication information before the authentication procedure starts.

(9) A terminal device including:
a mobile communication unit configured to perform mobile communication in a mobile communication network;
an acquisition unit configured to acquire authentication information including information provided by a subscriber identity module of the terminal device or information generated based on the information; and
a providing unit configured to provide the authentication information to another terminal device configured to perform an authentication procedure for connecting to a wireless network different from the mobile communication network by using the authentication information,
wherein the providing unit provides at least some of the authentication information to the other terminal device before the authentication procedure starts.

(10) The terminal device according to (9),
wherein the providing unit provides some of the authentication information to the other terminal device through wireless communication of a communication scheme different from a communication scheme with regard to the wireless network after the authentication procedure starts.

(11) An information processing device for a terminal device configured to perform mobile communication in a mobile communication network, the information processing device including:
a memory configured to store a program; and
at least one processor capable of executing the program,
wherein the program is a program that causes the processor to execute acquiring authentication information including information provided by a subscriber identity module of the terminal device or information generated based on the information, and providing the authentication information to another terminal device configured to perform an authentication procedure for connecting to a wireless network different from the mobile communication network by using the authentication information, and wherein the providing of the authentication information to the other terminal device includes providing of at least some of the authentication information to the other terminal device before the authentication procedure starts.

REFERENCE SIGNS LIST 1 communications system
30 mobile communication network
50 wireless network
51 access point
100 wireless communication terminal
141 information acquisition unit
143 authentication execution unit
200 mobile communication terminal
210 mobile communication unit
240 subscriber information module (SIM)
261 information acquisition unit
263 information providing unit

The invention claimed is:

1. A terminal device comprising:
at least one processor
configured to acquire authentication information provided by another terminal device configured to perform mobile communication in a mobile communication network; and
configured to perform an authentication procedure for connecting to a wireless network different from the mobile communication network by using the authentication information,
wherein the authentication information includes information provided by a subscriber identity module of the other terminal device or information generated based on the information, and
wherein the at least one processor
acquires at least some of the authentication information from the another terminal device before the authentication procedure starts according to a first communication scheme of the wireless network,
switches from the connection by the first communication scheme to connection by a second wireless communication between the terminal device and the another terminal device, the second wireless communication is different from the first communication scheme, and
acquires additional of the authentication information from the another terminal device using the second wireless communication after the authentication procedure starts.

2. The terminal device according to claim 1,
wherein the at least some of the information includes subscriber identification information for identifying a subscriber.

3. The terminal device according to claim 2,
wherein the subscriber identification information includes network information indicating the mobile communication network, and wherein the at least some of the information includes information indicating a length of the network information.

4. The terminal device according to claim 1,
wherein the at least some of the information includes identification information generated based on subscriber identification information for identifying a subscriber.

5. The terminal device according to claim 1,
wherein the second wireless communication is near field communication.

6. The terminal device according to claim 1,
wherein the wireless network is a wireless local area network (WLAN).

7. An information processing device for a terminal device, the information processing device comprising:
a memory configured to store a program; and
at least one processor capable of executing the program,
wherein the program is a program that causes the processor to execute
acquiring authentication information provided by another terminal device configured to perform mobile communication in a mobile communication network according to a first communication scheme of the wireless network, and
performing an authentication procedure for connecting to a wireless network different from the mobile communication network by using the authentication information,
wherein the authentication information includes information provided by a subscriber identity module of the other terminal device or information generated based on the information, and
wherein the acquiring of the authentication information includes
acquiring of at least some of the authentication information from the another terminal device before the authentication procedure starts according to the first communication scheme of the wireless network,
switching from the connection by the first communication scheme to connection by a second wireless communication between the terminal device and the another terminal device, the second wireless communication is different from the first communication scheme, and
acquiring additional of the authentication information from the another terminal device using the second wireless communication after the authentication procedure starts.

8. A terminal device comprising:
a mobile communication interface configured to perform mobile communication in a mobile communication network;
at least one processor configured to acquire authentication information including information provided by a subscriber identity module of the terminal device or information generated based on the information; and
configured to provide the authentication information to another terminal device configured to perform an authentication procedure for connecting to a wireless network different from the mobile communication network by using the authentication information,
wherein the at least one processor provides at least some of the authentication information to the other terminal device before the authentication procedure starts according to a first communication scheme of the wireless network, switches from the connection by the first communication scheme to connection by a second wireless communication between the terminal device and the another terminal device, the second wireless communication is different from the first communication scheme, and provides additional of the authentication information to the another terminal device using the second wireless communication after the authentication procedure starts.

9. An information processing device for a terminal device configured to perform mobile communication in a mobile communication network, the information processing device comprising:

a memory configured to store a program; and at least one processor capable of executing the program, wherein the program is a program that causes the processor to execute acquiring authentication information including information provided by a subscriber identity module of the terminal device or information generated based on the information, and providing the authentication information to another terminal device configured to perform an authentication procedure for connecting to a wireless network different from the mobile communication network by using the authentication information, and wherein the providing of the authentication information to the other terminal device includes providing of at least some of the authentication information to the other terminal device before the authentication procedure starts according to a first communication scheme of the wireless network, switching from the connection by the first communication scheme to connection by a second wireless communication between the terminal device and the another terminal device, the second wireless communication is different from the first communication scheme, and providing additional of the authentication information to the another terminal device using the second wireless communication after the authentication procedure starts.

* * * * *